(12) United States Patent
Douceur et al.

(10) Patent No.: US 8,719,336 B2
(45) Date of Patent: May 6, 2014

(54) METHOD AND APPARATUS FOR THWARTING TRAFFIC ANALYSIS IN ONLINE GAMES

(75) Inventors: John R. Douceur, Bellevue, WA (US); Jacob R. Lorch, Bellevue, WA (US); Daekyeong Moon, Berkeley, CA (US); Thomas Moscibroda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 894 days.

(21) Appl. No.: 12/364,913

(22) Filed: Feb. 3, 2009

(65) Prior Publication Data

US 2010/0197405 A1 Aug. 5, 2010

(51) Int. Cl.
   *G06F 15/16* (2006.01)

(52) U.S. Cl.
   USPC ........... 709/203; 709/205; 709/217; 709/227; 463/22; 463/42

(58) Field of Classification Search
   USPC ......... 709/202, 205, 203, 223, 225, 204, 232, 709/217, 227, 230; 463/30, 42, 22, 43
   See application file for complete search history.

(56) References Cited

U.S. PATENT DOCUMENTS

| | | | |
|---|---|---|---|
| 6,266,704 B1 | 7/2001 | Reed | |
| 6,917,974 B1 | 7/2005 | Stytz | |
| 6,986,036 B2 | 1/2006 | Wang | |
| 7,266,604 B1 * | 9/2007 | Nathan et al. | 709/225 |
| 7,447,622 B2 * | 11/2008 | Arama et al. | 709/200 |
| 7,712,137 B2 * | 5/2010 | Meier | 713/152 |
| 7,719,971 B1 * | 5/2010 | Issa | 709/203 |
| 7,891,004 B1 * | 2/2011 | Gelvin et al. | 726/26 |
| 7,979,368 B2 * | 7/2011 | Kapoor et al. | 706/20 |
| 8,057,307 B2 * | 11/2011 | Berstis et al. | 463/42 |
| 8,280,955 B1 * | 10/2012 | Tyagi et al. | 709/203 |
| 8,468,575 B2 * | 6/2013 | Perlman et al. | 725/133 |
| 8,606,942 B2 * | 12/2013 | Perlman et al. | 709/217 |
| 2004/0199370 A1 * | 10/2004 | Arama et al. | 703/20 |
| 2004/0236937 A1 | 11/2004 | Perkins | |
| 2005/0025172 A1 * | 2/2005 | Frankel | 370/437 |
| 2005/0086301 A1 * | 4/2005 | Eichler et al. | 709/204 |
| 2005/0192098 A1 * | 9/2005 | Guo et al. | 463/42 |
| 2005/0271207 A1 * | 12/2005 | Frey | 380/263 |
| 2006/0173781 A1 * | 8/2006 | Donner | 705/50 |

(Continued)

OTHER PUBLICATIONS

Baughman, N. et al.; "Cheat-Proof Playout for Centralized and Peer-to-Peer Gaming"; IEEE/ACM Transactions on Networking; vol. 15, No. 1; Feb. 2007; pp. 1-13.

(Continued)

*Primary Examiner* — Ramy M Osman
(74) *Attorney, Agent, or Firm* — Dan Choi; Carole Boelitz; Micky Minhas

(57) ABSTRACT

The subject disclosure relates to a method and apparatus for routing data in a network-based computer game via proxy computers. The method and system includes a set of techniques that utilizes the proxy computers to thwart traffic analysis in high-speed games while continuing to satisfy the games' latency requirements. The method and apparatus facilitates thwarting multiple classes of traffic analysis, including inspection of unencrypted header fields, observation of packet size, correlation of packet timing, and collusion among players. A matchmaking system for matching players in a network-based computer game in a manner that resists traffic analysis is also provided.

20 Claims, 16 Drawing Sheets

Peer-to-Peer Traffic

(56) References Cited

U.S. PATENT DOCUMENTS

| | | | |
|---|---|---|---|
| 2007/0105624 | A1 | 5/2007 | Tyler |
| 2007/0117635 | A1* | 5/2007 | Spanton et al. ............... 463/43 |
| 2008/0004107 | A1 | 1/2008 | Nguyen |
| 2009/0181772 | A1* | 7/2009 | Hargreaves et al. ........... 463/42 |
| 2010/0011115 | A1* | 1/2010 | Kliland et al. ............... 709/230 |
| 2010/0067525 | A1* | 3/2010 | Matsui ......................... 709/227 |
| 2010/0113159 | A1* | 5/2010 | Chapman et al. ............. 463/42 |

OTHER PUBLICATIONS

Baughman, N. et al.; "Cheat-Proof Playout for Centralized and Distributed Online Games"; INFOCOM; 2001; pp. 104-113.

Beigbeder, T. et al.; "The Effects of Loss and Latency on User Performance in Unreal Tournament 2003"; Proceedings of ACM Network and System Support for Games Workshop (NetGames); Portland, Oregon; 2004; pp. 144-151.

Bharambe, A. et al.; "Colyseus: A Distributed Architecture for Online Multiplayer Games"; Proceedings of NSDI '06; vol. 3; Mar. 2006; pp. 155-168.

Bharambe, A. et al.; "Mercury: A Scalable Publish-Subscribe System for Internet Games"; Proceedings of the $1^{st}$ Workshop on Network and System Support for Games; NetGames '02; 2002; pp. 3-9.

Chambers, C. et al.; "Mitigating Information Exposure to Cheaters in Real-Time Strategy Games"; Proceedings of NOSSDAV; 2005; pp. 7-12.

"Cheat Terminology Vocabulary Lesson by Sparrow—Version 1.0"; Bungie.net: Community: Forum Topic Listing: Forum Reply Listing; http://www.bungie.net/Forums/posts.aspx?postID=22035480; downloaded Nov. 28, 2008.

Claypool, M. et al.; "Latency and Player Actions in Online Games"; Communications of the ACM; vol. 49, No. 11; Nov. 2006; pp. 40-45.

Cronin, E. et al.; "Cheat-Proofing Dead Reckoned Multiplayer Games"; Proceedings of $2^{nd}$ International Conference on Application and Development of Computer Games; Hong Kong; Jan. 6-7, 2003.

DeLap, M. et al.; "Is Runtime Verification Applicable to Cheat Detection?"; Proceedings of $3^{rd}$ ACM SIGCOMM Workshop on Network and System Support for Games (NETGAMES); 2004; pp. 134-138.

Dick, M. et al.; "Analysis of Factors Affecting Players' Performance and Perception in Multiplayer Games"; Proceedings of $4^{th}$ ACM SIGCOMM Workshop on Network and System Support for Games (NETGAMES); 2005; pp. 1-7.

Dingledine, R. et al.; "Tor: The Second-Generation Onion Router"; In Proc. $13^{th}$ USENIX Security Symposium; 2004; San Diego, California.

Faerber, J.; "Network Game Traffic Modelling"; ACM Workshop on Network and System Support for Games; Apr. 2002.

Feng, W. et al.; "Provisioning Online Games: A Traffic Analysis of a Busy Counter-Strike Server"; ACM SIGCOMM Internet Measurement Workshop; Nov. 2002.

"Gamespy Cheats and Codes"; http://cheats.gamespy.com/; downloaded Nov. 28, 2008.

Gauthier-Dickey, C. et al.; "Low-Latency and Cheat-proof Event Ordering for Distributed Games"; Proceedings of NOSSDAV '04; Jun. 2004; pp. 134-139.

Gülcü, C. et al.; "Mixing Email with Babel"; In Proc. of NDSS; Feb. 22-23, 1996; San Diego, California.

Goldschlag, D. et al.; "Hiding Routing Information"; In Proc. $1^{st}$ Intl. Workshop on Information Hiding; May 1996; Cambridge, UK.

Goldschlag, D. et al.; "Onion Routing for Anonymous and Private Internet Connections"; Communications of the ACM; vol. 42, No. 2; Feb. 1999; pp. 39-41.

Jenkins, K.; "Designing secure, flexible, and high performance game network architectures"; Gamasutra, Think Services Game Group; http://www.gamasutra.com/view/feature/2174/designing_secure_flexible...php; Dec. 6, 2004.

Lee, J.; "Wage Slaves: From sweatshops to stateside corporations, some people are profiting off of MMO gold"; http://www.1up.com/do/feature?cId=3141815; May 7, 2005.

Lee, Y. et al.; "Measurement and Estimation of Network QoS among Peer Xbox 360 Game Players"; proceedings of Passive and Active Measurement Conference (PAM); Apr. 2008; pp. 41-50.

Markoff, J.; "Voice Encryption May Draw U.S. Scrutiny"; New York Times Online; http://www.nytimes.com/2006/05/22/technology/22privacy.html; May 22, 2006.

McGraw, G. et al.; "Online Games and Security"; IEEE Security & Privacy; Sep./Oct. 2007; pp. 76-80.

Pozzobon, M.; "Quake 3 Packet and Traffic Characteristics"; CAIA Technical Report 021220A; Dec. 2002.

"PunkBuster Online Countermeasures"; http://www.evenbalance.com; downloaded Nov. 28, 2008.

Reed, M. et al.; "Anonymous Connections and Onion Routing"; IEEE Journal on Selected Areas in Communications; vol. 16, No. 4; May 1998; pp. 482-494.

Rider, S.; "A Bridge too Far: The World of Halo 2 Cheating"; GamesFirst!; http://www.gamesfirst.com/?id=1342; May 26, 2006.

Shimizu, K.; "The Cell Broadband Engine Processor Security Architecture"; http://www.ibm.com/developerworks/power/library/pa-cellsecurity/; Apr. 24, 2006.

"Video game sales break records"; Yahoo! Games; http://us.i1.yimg.com/videogames.yahoo.com/feature/video-game-sales-break-records/1181404; Jan. 22, 2008.

World of Hackcraft: Fooling the Warden; http://www.ctoforaday.com/articles/000059.html; Nov. 16, 2006.

Yan, J. et al.; "A Systematic Classification of Cheating in Online Games"; Proceedings of NETGAMES; 2005; pp. 1-9.

Yeung S. et al.; "Detecting Cheaters for Multiplayer Games: Theory, Design and Implementation[1]"; Proceedings of $3^{rd}$ IEEE Consumer Communications and Networking Conference; vol. 6; 2006; pp. 1178-1182.

Zander, S. et al.; "A Traffic Model for the Xbox Game Halo 2"; Proceedings of the International Workshop on Network and Operating Systems Support for Digital Audio and Video (NOSSDAV); 2005; ACM Press; New York, New York.

* cited by examiner

Client-to-Server Traffic

Clients    Sender Proxy    Receiver Proxy    Server

Server-to-Client Traffic

Peer-to-Peer Traffic

METHOD AND APPARATUS FOR THWARTING TRAFFIC ANALYSIS IN ONLINE GAMES

TECHNICAL FIELD

The subject disclosure is generally directed towards routing data in a computer network, and more particularly towards routing gaming data so as to thwart traffic analysis during online gaming sessions.

BACKGROUND

Cheating is rampant in online multiplayer games. Such cheating is unsurprising for persistent-world games since players accrue value for their performance, which may sometimes result in monetary prizes. However, with respect to short-term action games in which the payoff is merely bragging rights, there is also significant cheating. The prevalence of such cheating threatens to erode players' confidence in the integrity of game systems, which could lead to a contraction in this rapidly growing industry.

For personal computer (PC) games, cheating has proven to be an extremely challenging problem since players can arbitrarily modify game programs that run on their PCs. However, for console games, the problem is more tractable, as proprietary platforms can prevent loading and executing arbitrary code. In addition, modern consoles encrypt the messages they send to each other, which generally prevents a would-be cheater from observing message contents and from injecting forged messages.

Despite these safeguards, players can and do cheat in console games. For instance, players can drop or delay network packets, which is particularly effective if done selectively, as when applied only to players on an opposing team. In addition, players can launch denial-of-service (DoS) attacks against their opponents' machines.

Online console games can be broadly divided into two classes, according to their communication structure: client/server and peer-to-peer. Most online console games (e.g., Halo 3©, Gears of War©, Call of Duty IV©, etc.) employ a client/server (C/S) architecture. In C/S games, one machine acts as a server, and all others act as clients. The server maintains all of the game's state, wherein game play is temporally divided into a sequence of frames, each of which is typically around 50 ms in length. During each frame, every client sends a message to the server to describe the actions of the client's local player. The server processes the messages it receives, updates the game state, and sends messages back to the clients to inform them of the new state. The server machine also acts as a client for its own player, but communication between this client and the server does not go over the network. To be eligible to participate in online gaming, machines must meet a minimal set of performance requirements specified by the game title. To be selected as a server, there are often additional requirements, such as higher network bandwidth and a routable IP address.

For online games utilizing a peer-to-peer (P2P) architecture (e.g., Perfect Dark Zero©, Call of Duty III©, etc.), all machines participating in a particular game collectively maintain the game's state. On each frame, every peer sends information about its portion of the state to other peers. Depending on the game, each peer might send information to every other peer in the game, or only to a subset thereof. The latter situation arises in games that employ area-of-interest filtering, wherein a player's machine only receives information that is currently relevant to the player.

With respect to latency, C/S and P2P games generally have similar network-latency requirements. Several user studies have investigated the effect of network latency on the performance and playability of online games. The bound on tolerable latency varies by game category, wherein the most stringent requirements are generally for first-person shooter games, which become unplayable when latencies start exceeding 150 ms.

Although most state-of-the-art game consoles implement sophisticated security features, they still expose a threat model that admits several powerful attacks. For instance, in modern game consoles such as PlayStation3© and Xbox 360©, security features generally focus on averting exploits that were widely observed on earlier console systems. These earlier exploits took advantage of two main attack vectors: First, players were able to observe and modify the code running in their local consoles; second, players were able to intercept, decode, and inject packets into the data streams to and from other consoles.

To address the first attack vector, modern console systems prevent loading and executing arbitrary code. Preventing such loading and executing of code is usually accomplished through a combination of cryptographic verification of application binaries, process and memory isolation, and hardware-based management of encryption keys.

For the second attack vector, consoles encrypt all game-critical communication with each other, using single-use session keys, symmetric-key encryption, message authentication, and cryptographic nonces. This encryption prevents an attacker from observing the content of messages. It also prevents an attacker from forging new messages or replaying messages into the communication stream.

For most modern game consoles, it is thus fairly safe to assume that game consoles will run the code they are supposed to, that players will not be able to observe the content of game-critical messages, and that packets received by a console were legitimately generated by another console. However, despite these assumptions, modern consoles are still vulnerable to several powerful attacks.

An exemplary threat model 100 for one such attack is provided in FIG. 1, wherein attackers are players in a game. Here, although the attackers may not have access to the internal state of their consoles 120, they can place packet sniffers/filters 130 between their consoles 120 and the network 110, as shown. The packet sniffers/filters 130 cannot decrypt the payloads of network packets, but they can observe packet header fields, packet sizes, and the relative timing of packets. The packet sniffers/filters 130 could be general-purpose PCs, making them arbitrarily programmable. Thus, attackers can configure their sniffers/filters 130 to drop or delay packets based on any observable property of the packet.

Multiple attackers may also collude by sharing their independently observed information. For instance, Player 1 might observe properties of her outgoing packets and send this information to Player 4 so that he can test his incoming packets against these properties. Player 1 can even delay her outgoing packets so that her information has time to reach Player 4 before her game packets do. Player 1 can also alter her data stream to make it more readily identifiable to Player 4. For instance, Player 1 can drop outgoing packets in a particular pattern, or she can alter the timing of packets.

Threat model 100 thus provides a model in which any of several powerful attacks may be launched. For instance, an attacker may launch a denial-of-service (DoS) attack in which the attacker floods an opponent's machine with traffic. Such an attack requires merely knowing the IP address of the attack target.

Other attacks generally fall into the class of dropping or delaying packets. In C/S games, the crudest form of such attack is standbying, which involves putting one's DSL or cable modem into standby mode to block traffic to and from all clients. By standbying at critical moments in the game, the player at the server can continue to strike opponents while other players are frozen. Because standbying is far from subtle, it is readily detectable by in-game traffic auditing. However, by applying traffic analysis, the attacker can stay under the auditing radar by surgically forcing packet drops on particular players, such as the opponent currently being fought. Also, a server-side attacker can help particular players (e.g., teammates or friends) by perturbing packets only to or from players other than the chosen ones.

Because games often "trust" clients, particularly in light of game consoles' security features, such games may be particularly vulnerable to attacks from clients. For instance, although clients know that the server is the source of all inbound traffic, they can still gain leverage by inferring the likely type of a packet. Thus, clients can drop inbound packets with undesirable consequences, such as those indicating damage. Here, it should be noted that, because each peer in a P2P game is effectively part of the server as well as a client, all of the above attacks have direct analogies in the P2P setting.

A potential defense to the aforementioned attacks may include anonymizing network traffic, thus preventing traffic analysis from revealing the sources and destinations of game packets. For non-gaming applications, a well-known mechanism for performing such anonymization is onion routing. In an onion routing scheme, each packet is encrypted in multiple layers and forwarded through a series of relays, each of which peels off one cryptographic layer. Unfortunately, onion routing incurs excessive latency, which may be adequate for applications insensitive to latency, but is intolerable for high-speed online games.

Accordingly, there is a need for a method and system for thwarting traffic analysis in online games. Such a need includes a need for preventing inspection of data packet headers, data packet size, and data packet timing, in a manner that conforms to the latency requirements of online games.

The above-described deficiencies of current techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Embodiments of a method and apparatus for routing data in a network-based computer game using proxy computers are described. In various non-limiting embodiments, the method and apparatus include facilitating assigning the proxy computers to player computers. Within such embodiment, the proxy computer is a network node that routes gaming data between the player computer and at least one other player computer. Gaming data is received at the proxy computer from a source such that the gaming data is embedded within an encrypted set of data packets. The data packets are then decrypted so as to determine a destination for the gaming data. Finally, the gaming data is transmitted from the proxy computer to the destination, either directly or via another proxy computer, so as to conform with a latency tolerance of the computer game.

Embodiments of a method and apparatus for routing data in a network-based computer game from a player computer are also described. In various non-limiting embodiments, the method and apparatus include facilitating establishing a network connection with at least one proxy computer from the player computer. Within such embodiment, each of the proxy computers is a network node assigned to the player computer that facilitates routing game data between the player computer and at least one other player computer in a manner conforming with a latency tolerance of the computer game. The method and apparatus also facilitates exchanging data packets with the proxy computer such that the player computer performs at least one of two functions. Namely, within such embodiment, the player computer may either be configured to receive a set of transmitted data packets from the proxy computer, or the player computer may be configured to transmit a set of generated data packets to the proxy computer, wherein the generated data packets include an encryption of header information pertaining to another player computer.

In yet another non-limiting embodiment, a method for matching players in a network-based computer game is provided. The method includes receiving a plurality of requests for participating in the computer game, and selecting a host computer and at least one guest computer for the game. Within such embodiment, at least one candidate-proxy computer is selected, and at least one roster for the game is identified that conforms to criteria provided by the guest computer. Such a roster may list information relating to a particular game including, for example, information about the game's host, guest players, latency properties, skill level, etc. The method also includes sending the host address to the candidate-proxy computer such that the host address is not sent to the guest computer. Finally, the method includes sending the guest address to a proxy computer assigned to a computer corresponding to the host of the identified roster such that the guest address is not sent to the host computer. For this method, it should thus be noted that, although each of the host and guests learn of the proxies, and the proxies all likewise learn of the host and guests, no host or guest learns of any of the other host or guests' address.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

As discussed in the background, among other things, conventional systems do not provide an adequate mechanism for thwarting traffic analysis in online games. Accordingly, in various non-limiting embodiments, the subject specification provides a method and system for securely routing gaming data within acceptable latency levels. As a roadmap for what follows, an overview of various embodiments is first described and then exemplary, non-limiting optional implementations are discussed in more detail for supplemental context and understanding.

Various embodiments for implementing a set of techniques (hereinafter sometimes referred to as "banana routing") that thwart traffic analysis in high-speed games while continuing to satisfy games' stringent latency requirements are disclosed. Techniques are provided for thwarting multiple classes of traffic analysis, including inspection of unencrypted header fields, observation of packet size, correlation of packet timing, and collusion among players. Various particular banana routing embodiments are also disclosed for both client/server games and peer-to-peer games.

Figure 1:
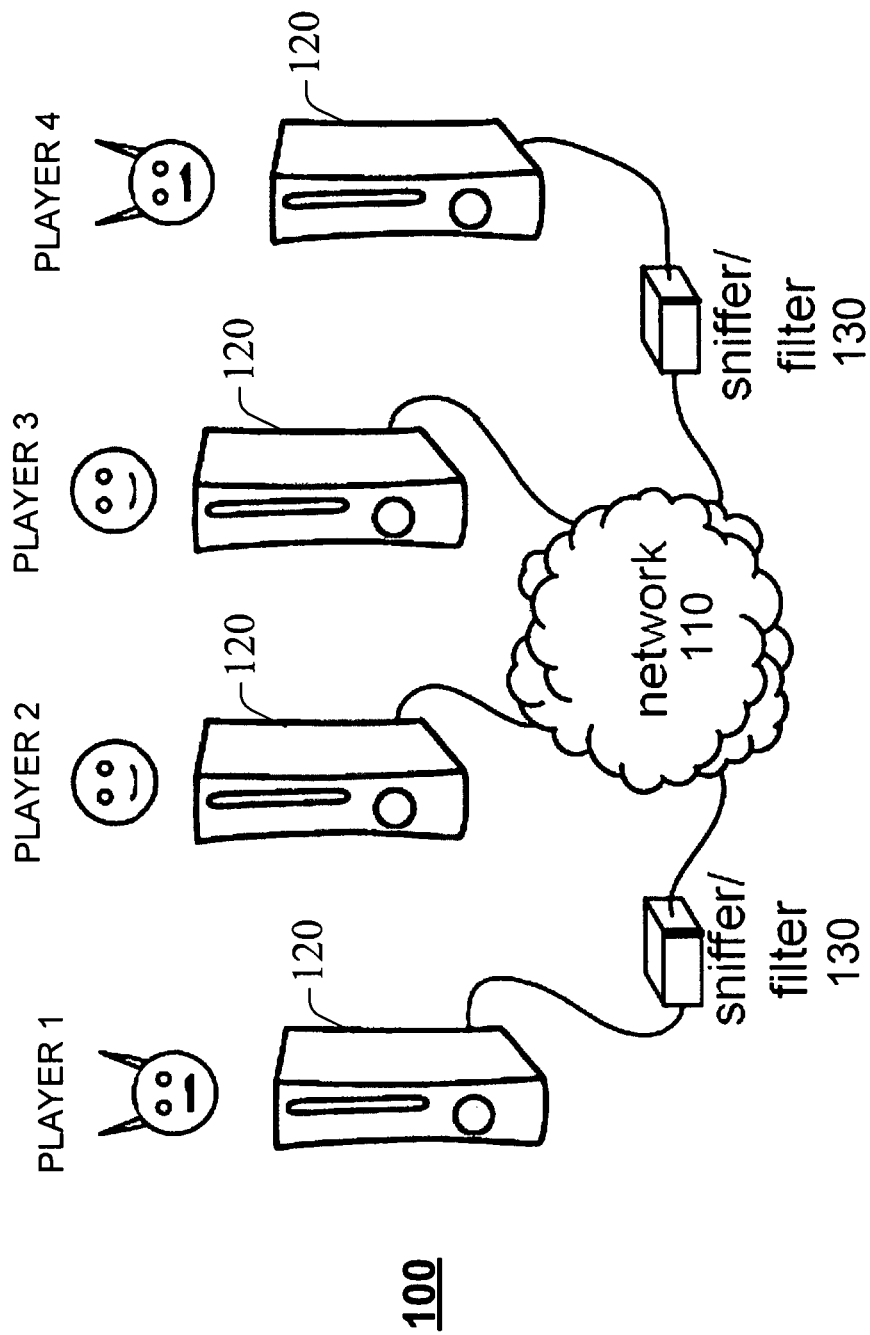
FIG. 1 is an illustration of an exemplary threat model.
Figure 2:
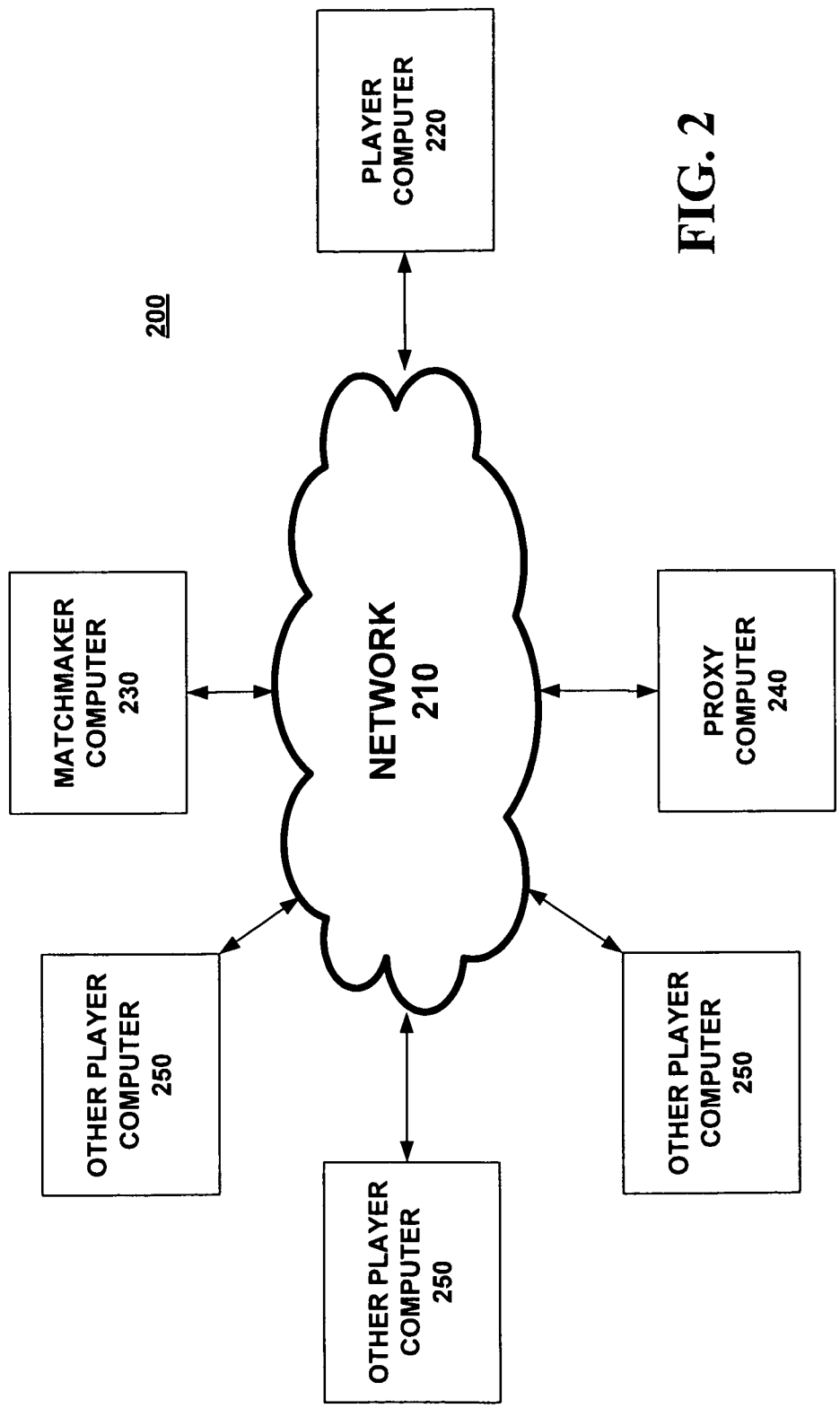
FIG. 2 is an illustration of an exemplary system for routing data in accordance with an aspect of the subject specification.

Referring first to FIG. 2, an exemplary system for facilitating banana routing is provided. As illustrated, system 200 includes a player computer 220 configured to participate in an online game against/with any of player computers 250 via network 210. In an embodiment, system 200 facilitates client-server games and/or peer-to-peer games, wherein matchmaker computer 230 matches player computer 220 with other player computers 250.

In one aspect, gaming data is routed between player computer 220 and any of player computers 250 via at least one proxy computer 240 (hereinafter sometimes referred to as "relays"). Within such embodiment, data packets that include the gaming data are encrypted at the source (i.e., either at player computer 220 or other player computers 250), wherein such encryption includes encrypting the data packet header information. The encrypted data packets are then sent to proxy computer 240 where the header information is decrypted so as to ascertain the destination to which the data packets should be routed. For instance, data packets originating from player 220 can be routed to other player computers 250 via proxy computer 240. Similarly, data packets originating from other player computers 250 can be routed to player computer 220 via proxy computer 240. Here, it should be appreciated that player computer 220 can be assigned a single proxy computer (e.g., where a single proxy computer routes data packets to and from player computer 220), or multiple proxy computers (e.g., where one proxy computer is used to route data packets to player computer 220 and another proxy computer is used to route data packets from player computer 220). Moreover, as will be discussed in more detail below, any of several proxy computer assignment configurations can be contemplated.

Figure 3:
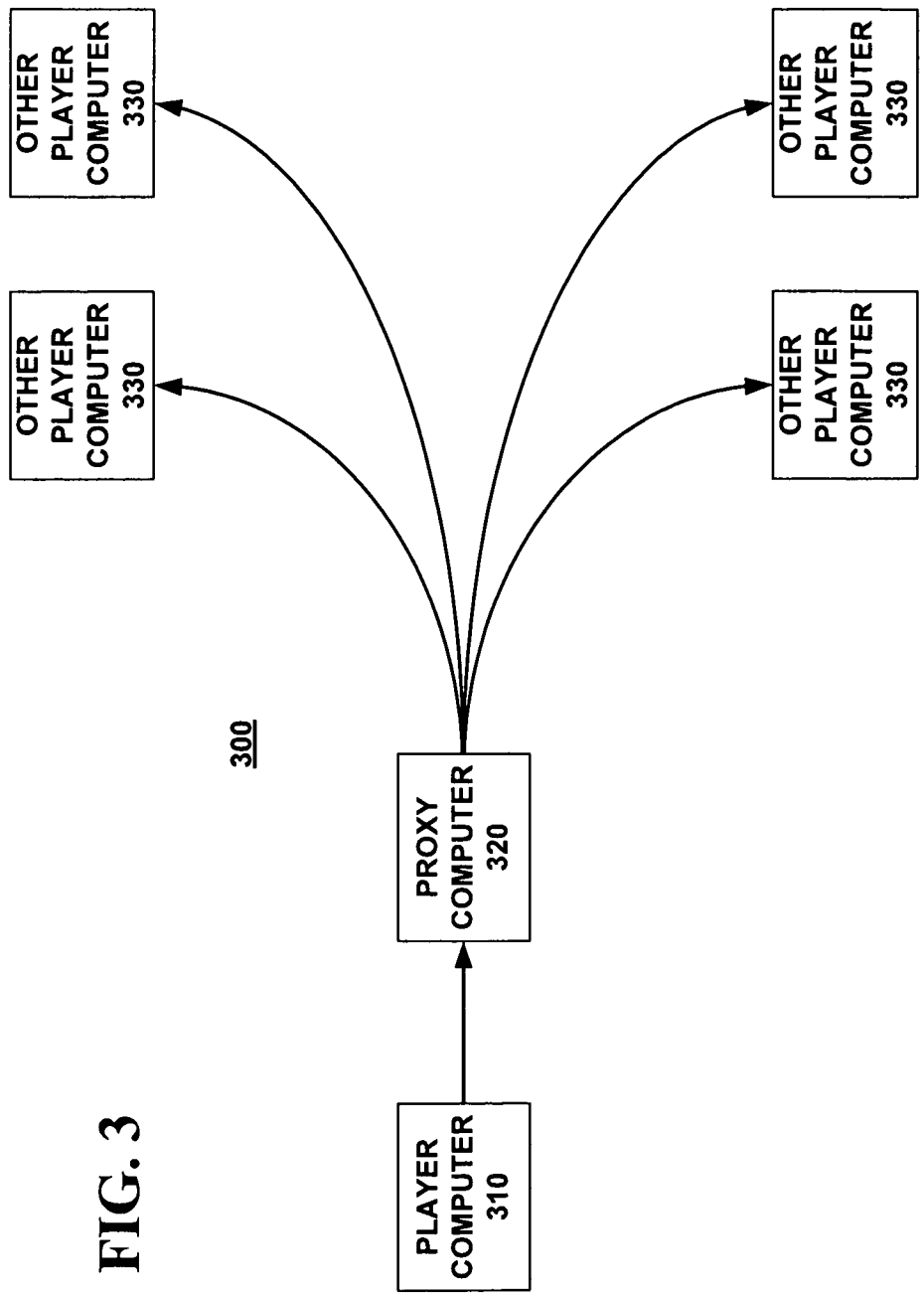
FIG. 3 illustrates an exemplary sender proxy in accordance with an aspect of the subject specification.
Figure 4:
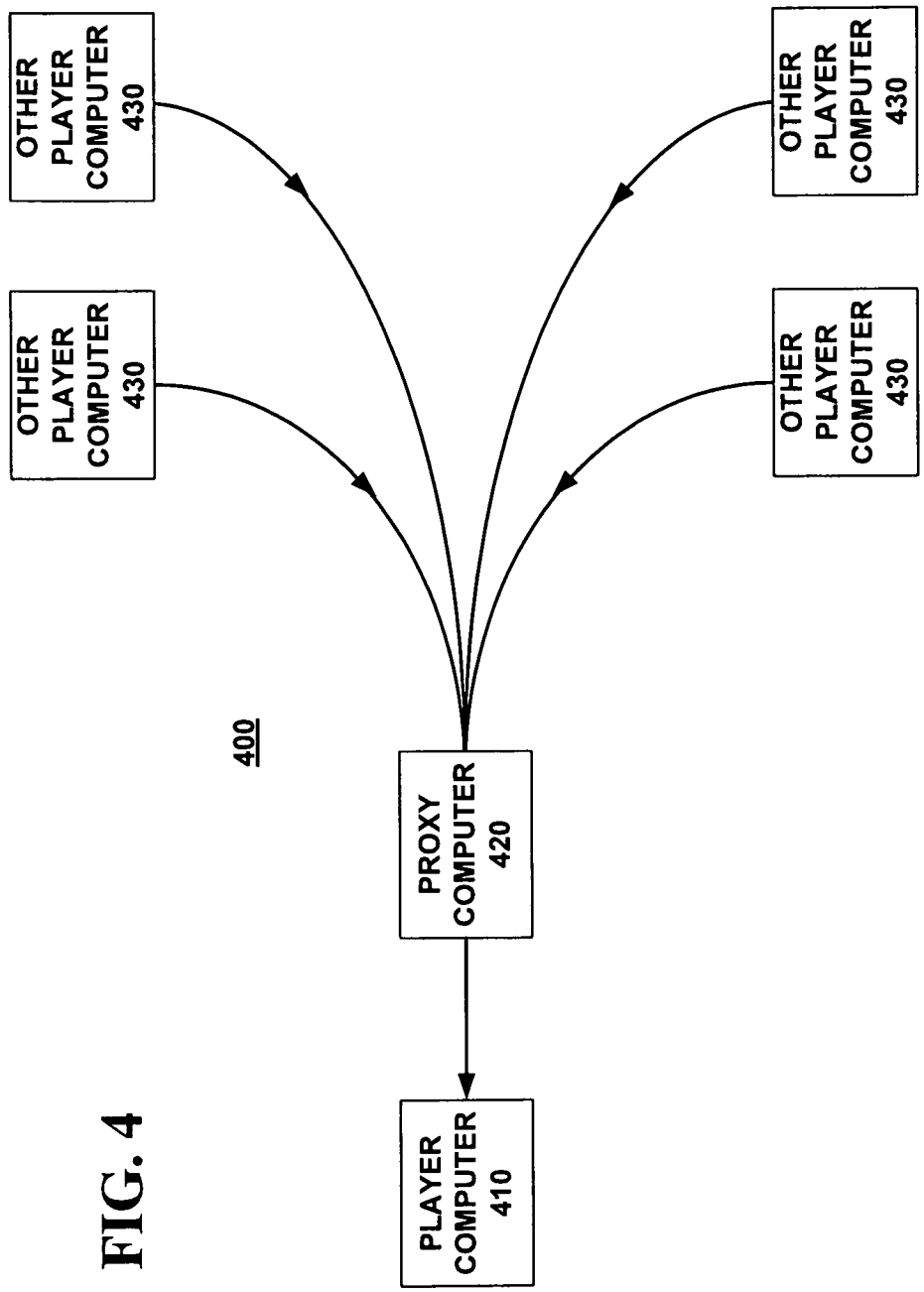
FIG. 4 illustrates an exemplary receiver proxy in accordance with an aspect of the subject specification.

In contrast to onion routing, an aspect of banana routing thus encrypts data packets in a single layer and forwards them through a single relay. Within such embodiment, each relay fans in traffic from multiple sources or fans out traffic to multiple destinations. For instance, as illustrated in FIG. 3, an exemplary system 300 is provided in which a proxy computer 320 facilitates fanning traffic out from a player computer 310 to one or more other player computers 330. Such a proxy is referred to below as a sender proxy. In FIG. 4, another exemplary system 400 is provided in which a proxy computer 420 facilitates fanning traffic in to a player computer 410 from one or more other player computers 430. Such a proxy is referred to below as a receiver proxy.

Figure 5:
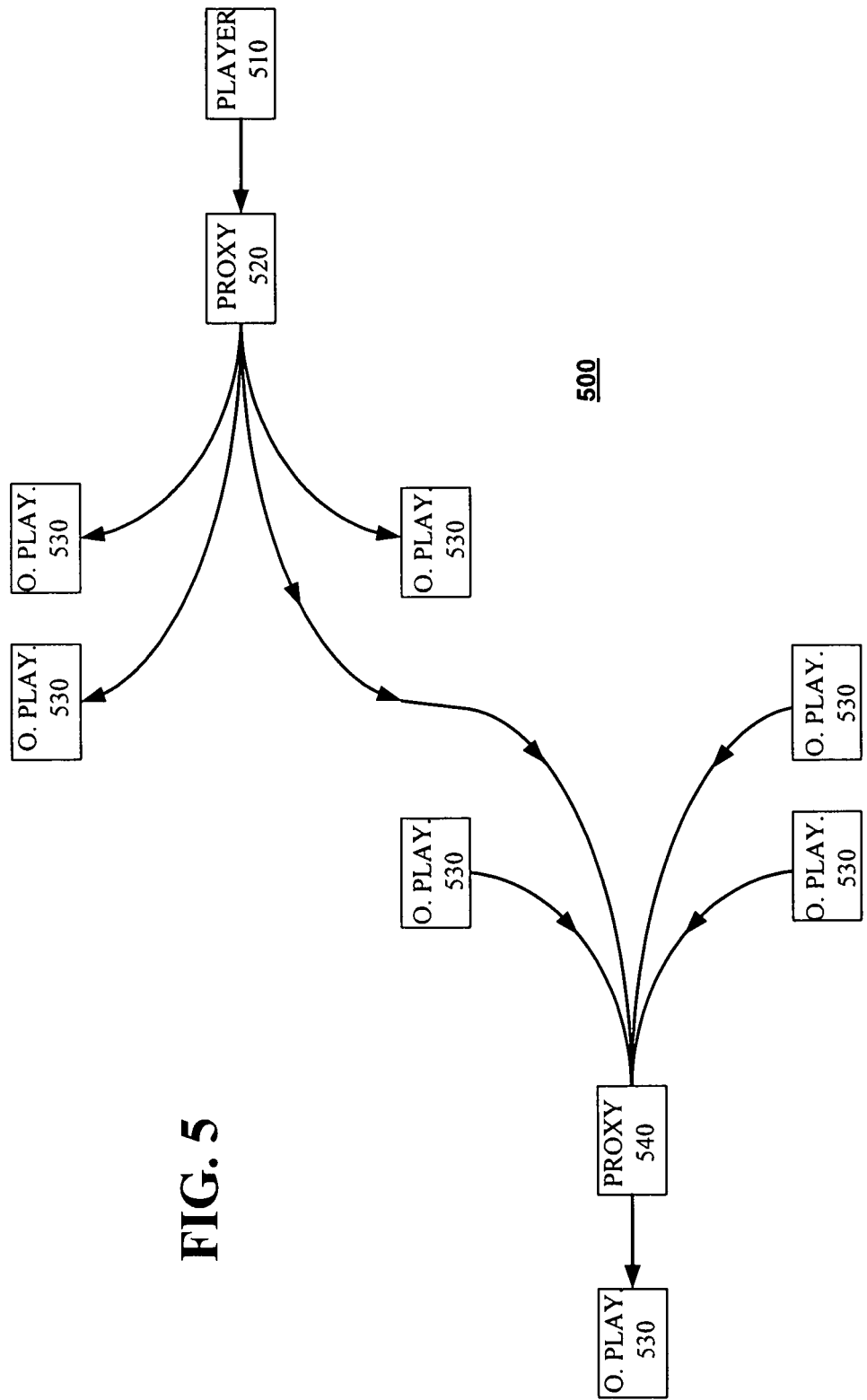
FIG. 5 illustrates an exemplary sender proxy linked to an exemplary receiver proxy in accordance with an aspect of the subject specification.

It should be appreciated that a particular online game may include various proxy assignment combinations. For instance, in one aspect, a player computer may be assigned only one of a receiver proxy and a sender proxy. In another aspect, a player computer may be assigned a single proxy computer that functions as both a receiver proxy and a sender proxy. In yet another aspect, as illustrated in FIG. 5, a system 500 may include a sender proxy 520 assigned to a player computer 510 routing data to a receiver proxy 540 assigned to another player computer 530. Other proxy combinations/techniques are discussed in more detail below including shared proxies, proxy sets, proxy rotation, unbound proxies, and remote proxies.

Figure 6:
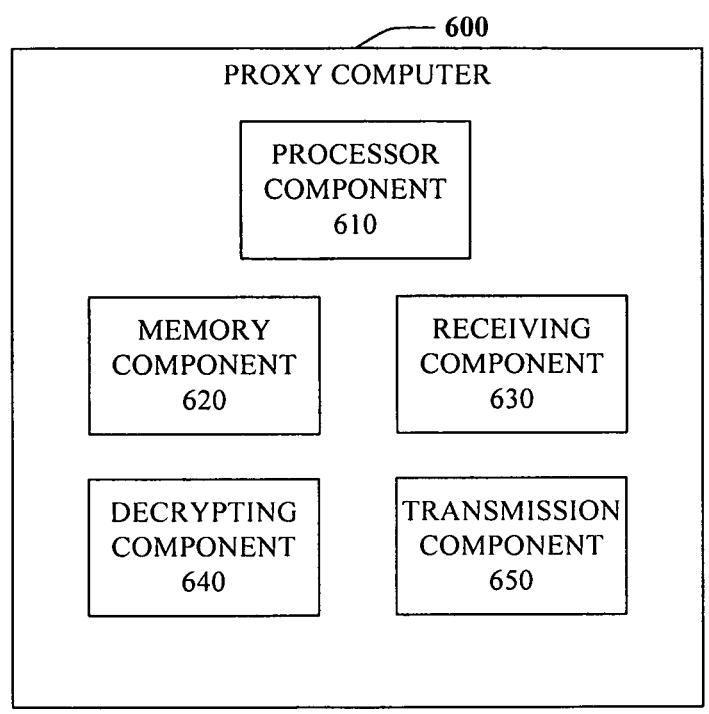
FIG. 6 illustrates a block diagram of an exemplary proxy computer that facilitates routing gaming data in accordance with an aspect of the subject specification.

Referring next to FIG. 6, a block diagram of an exemplary proxy computer that facilitates routing data in accordance with various aspects is provided. As illustrated, proxy computer 600 includes processor component 610, memory component 620, receiving component 630, decrypting component 640, and transmission component 650.

In one aspect, processor component 610 is configured to execute computer-readable instructions related to performing any of a plurality of functions. Such functions may include controlling any of memory component 620, receiving component 630, decrypting component 640, and/or transmission component 650. Other functions performed by processor component 610 may include analyzing information and/or generating information that can be utilized by any of memory component 620, receiving component 630, decrypting component 640, and/or transmission component 650. Here, it should also be noted that processor component 610 can be a single processor or a plurality of processors.

In another aspect, memory component 620 is coupled to processor component 610 and configured to store computer-readable instructions executed by processor component 610. Memory component 620 may also be configured to store any of a plurality of other types of data including data packets received from a source via receiving component 630, as well as data generated by any of decrypting component 640, and/or transmission component 650. Memory component 620 can be configured in a number of different configurations, including as random access memory, battery-backed memory, hard disk, magnetic tape, etc. Various features can also be implemented upon memory component 620, such as compression and automatic back up (e.g., use of a Redundant Array of Independent Drives configuration).

For some aspects, receiving component 630 and transmission component 650 are coupled to processor component 610 and collectively configured to interface proxy computer 600 with external entities. For instance, receiving component 630 may be configured to receive encrypted data packets from a source (e.g., from a player computer, teammate computer, opponent computer, and/or a sender proxy computer), whereas transmission component 650 may be configured to transmit contents of the data packets to a destination (e.g., to a player computer, teammate computer, opponent computer, and/or a receiver proxy computer).

Decrypting component 640 may also be coupled to processor component 610, wherein decrypting component 640 is configured to decrypt encrypted data packets received from a source. Here, it should be noted that decrypting component 640 and processor 610 may be configured to collectively execute any of a plurality of decrypting algorithms known in the art. In a particular embodiment, decrypting component 640 is configured to decrypt at least a data packet header so as to ascertain a destination for the contents of the data packets.

Figure 7:
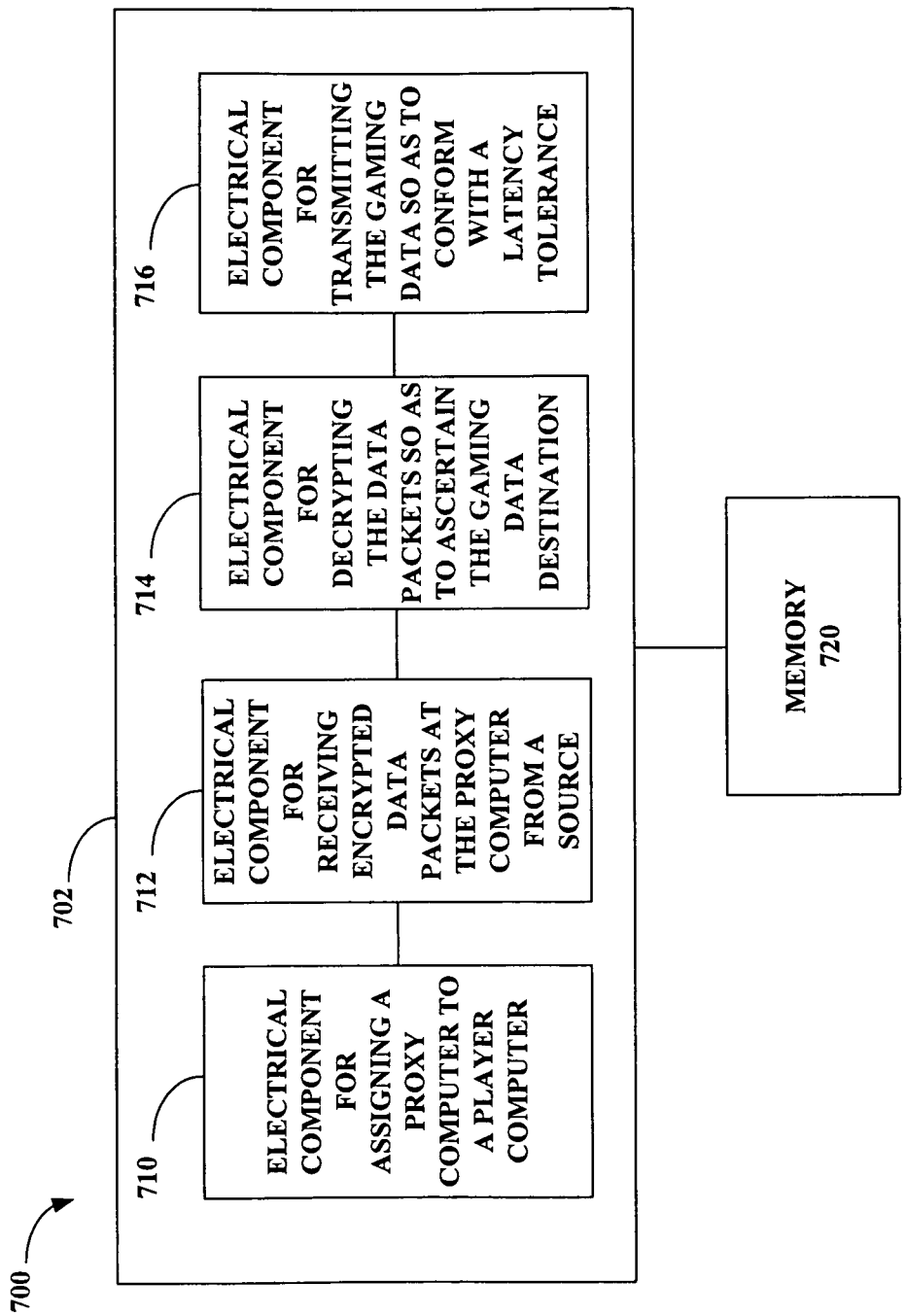
FIG. 7 is an illustration of an exemplary coupling of electrical components that effectuate routing gaming data from a proxy computer in accordance with an aspect of the subject specification.

Referring next to FIG. 7, illustrated is an exemplary system 700 that enables routing gaming data in a network-based computer game. System 700 can reside within a proxy computer, for instance, wherein system 700 also includes functional blocks that can represent functions implemented by a processor, software, or combination thereof (e.g., firmware). Moreover, system 700 includes a logical grouping 702 of electrical components that can act in conjunction. As illustrated, logical grouping 702 can include an electrical component for assigning a proxy computer to a player computer 710. Further, logical grouping 702 can include an electrical component for receiving encrypted data packets from a source 712. Logical grouping 702 can also include an electrical component for decrypting the encrypted data packets so as to ascertain a destination for the contents of the data packets 714, as well as an electrical component for transmitting the contents of the data packets so as to conform with a latency tolerance for the game 716. Additionally, system 700 can include a memory 720 that retains instructions for executing functions associated with electrical components 710, 712, 714, and 716. While shown as being external to memory 720, it is to be understood that electrical components 710, 712, 714, and 716 can exist within memory 720.

Figure 8:
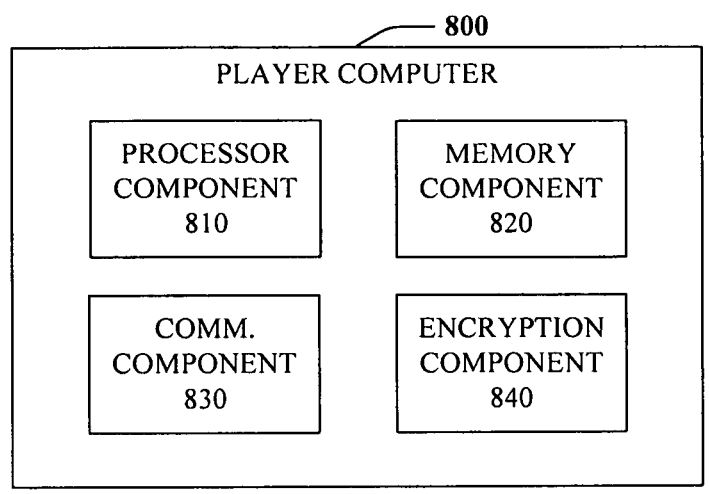
FIG. 8 illustrates a block diagram of an exemplary player computer that facilitates routing gaming data in accordance with an aspect of the subject specification.

Referring next to FIG. 8, a block diagram of an exemplary player computer that facilitates routing data in accordance with various aspects is provided. As illustrated, player computer 800 includes processor component 810, memory component 820, communication component 830, and encryption component 840.

It should be noted that processor component 810 is generally analogous to processor component 610 in FIG. 6. Namely, processor component 810 is configured to execute computer-readable instructions related to performing any of a plurality of functions. Such functions may include controlling any of memory component 820, communication component 830, and/or encryption component 840. Other functions performed by processor component 810 may include analyzing information and/or generating information that can be utilized by any of memory component 820, communication component 830, and/or encryption component 840.

It should be similarly noted that memory component 820 is generally analogous to memory component 620. Namely, memory component 820 is coupled to processor component 810 and configured to store computer-readable instructions executed by processor component 810. Memory component 820 may also be configured to store any of a plurality of other types of data including data packets received from a proxy via communication component 830, as well as data generated by encrypting component 840.

In an aspect, communication component 830 is coupled to processor component 810 and configured to interface player computer 800 with external entities. For instance, communication component 830 may be configured to receive gaming data from a proxy (e.g., from a sender proxy assigned to an opponent/teammate computer or from a receiver proxy assigned to player computer 800) and/or communication component 830 may be configured to transmit encrypted data packets to a proxy (e.g., to a receiver proxy assigned to an opponent/teammate computer or to a sender proxy assigned to player computer 800).

In another aspect, encrypting component 840 is also coupled to processor component 810 and configured to encrypt data packets transmitted to a proxy. Here, it should be noted that encrypting component 840 and processor 810 may be configured to collectively execute any of a plurality of encrypting algorithms known in the art. In a particular embodiment, encrypting component 840 is configured to encrypt at least the data packet header so as to hide the ultimate destination of the data packets.

Figure 9:
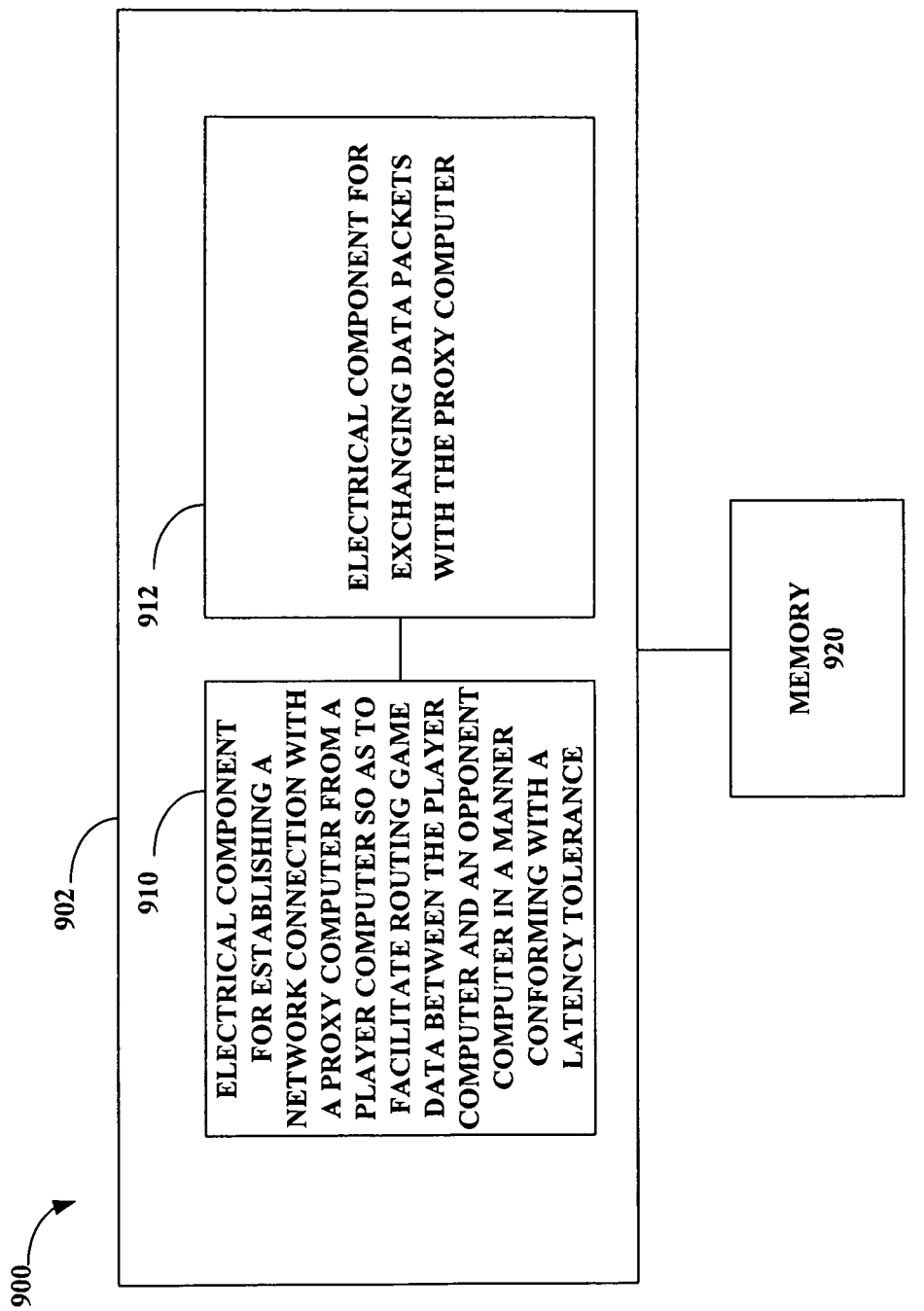
FIG. 9 is an illustration of an exemplary coupling of electrical components that effectuate routing gaming data from a player computer in accordance with an aspect of the subject specification.

Referring next to FIG. 9, illustrated is a system 900 that enables routing gaming data in a network-based computer game, wherein system 900 may reside within the aforementioned player computer 800. Similar to system 700 in FIG. 7, system 900 also includes functional blocks that can represent functions implemented by a processor, software, or combination thereof (e.g., firmware). Moreover, system 900 includes a logical grouping 902 of electrical components that can act in conjunction similar to logical grouping 702 in system 700. As illustrated, logical grouping 902 can include an electrical component for establishing a network connection with a proxy computer assigned to the player computer 910. Logical grouping 902 can also include an electrical component for exchanging data packets with the proxy computer 912. Additionally, system 900 can include a memory 920 that retains instructions for executing functions associated with electrical components 910 and 912. While shown as being external to memory 920, it is to be understood that electrical components 910 and 912 can exist within memory 920.

Figure 10:
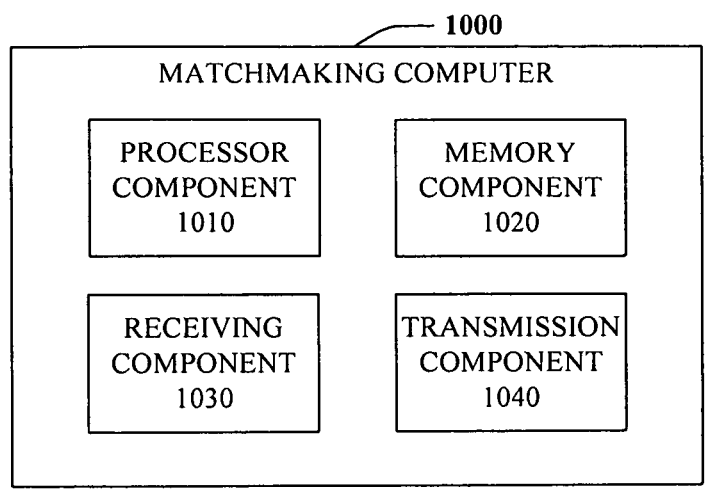
FIG. 10 illustrates a block diagram of an exemplary matchmaking computer that facilitates matching players in a network-based game in accordance with an aspect of the subject specification.

Referring next to FIG. 10, a block diagram of an exemplary matchmaking computer for facilitating matching players in a network-based computer game is provided. As illustrated, matchmaking computer 1000 includes processor component 1010, memory component 1020, receiving component 1030, and transmission component 1040.

Here, it should again be noted that processor component 1010 is generally analogous to processor component 610 in FIG. 6. Moreover, exemplary functions executed by processor component 1010 may include controlling any of memory component 1020, receiving component 1030, and/or transmission component 1040. Other functions performed by processor component 1010 may include analyzing information and/or generating information that can be utilized by any of memory component 1020, receiving component 1030, and transmission component 1040.

It should be similarly noted that memory component 1020 is generally analogous to memory component 620. Namely, memory component 1020 is coupled to processor component 1010 and configured to store computer-readable instructions executed by processor component 1010. Memory component 1020 may also be configured to store any of a plurality of other types of data including host/guest addresses received via receiving component 1030, as well as data generated by transmission component 1040.

In an aspect, receiving component 1030 and transmission component 1040 are coupled to processor component 1010 and collectively configured to interface matchmaking computer 1000 with external entities. For instance, receiving component 1030 may be configured to receive requests for participating in a game from player computers, whereas transmission component 1040 may be configured to transmit host/guest addresses to particular proxy computers.

Figure 11:
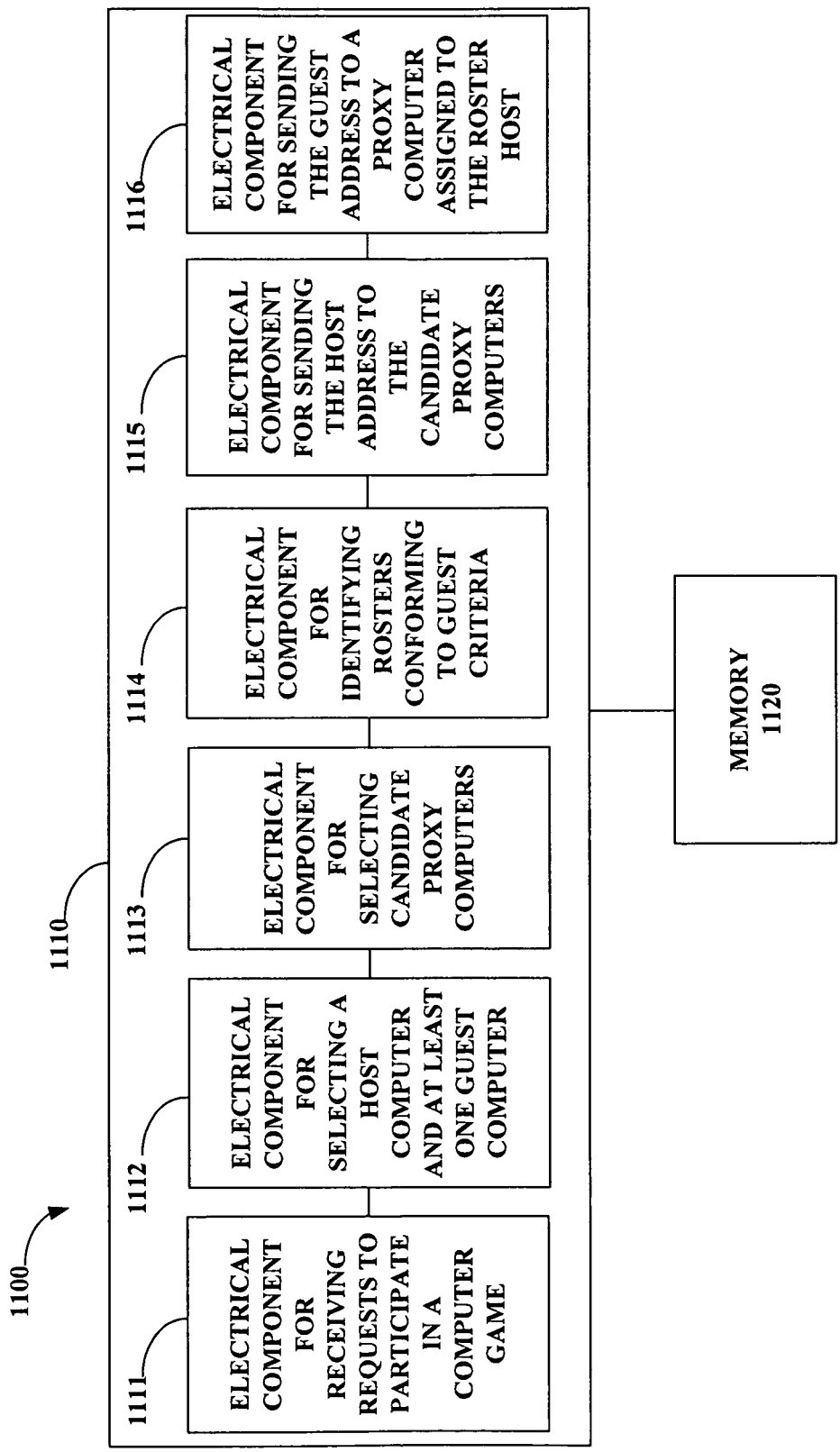
FIG. 11 is an illustration of an exemplary coupling of electrical components that effectuate matching players in a network-based game in accordance with an aspect of the subject specification.

Referring next to FIG. 11, illustrated is a system 1100 that enables matching players in a network-based computer game, wherein system 1100 may reside within the aforementioned matchmaking computer 1000. Similar to system 700 in FIG. 7, system 1100 includes functional blocks that can represent functions implemented by a processor, software, or combination thereof (e.g., firmware). Moreover, system 1100 includes a logical grouping 1110 of electrical components that can act in conjunction similar to logical grouping 702 in system 700. As illustrated, logical grouping 1110 can include an electrical component for receiving requests to participate in a computer game 1111, and an electrical component for selecting a host computer and at least one guest computer 1112. Further, logical grouping 1110 can include an electrical component for selecting candidate proxy computers 1113, as well as an electrical component for identifying rosters conforming to a guest criteria 1114. Logical grouping 1110 can also include an electrical component for sending the host address to the candidate proxy computers 1115, and an electrical component for sending the guest address to a proxy computer assigned to the roster host 1116. Additionally, system 1100 can include a memory 1120 that retains instructions for executing functions associated with electrical components 1111, 1112, 1113, 1114, 1115, and 1116. While shown as being external to memory 1120, it is to be understood that electrical components 1111, 1112, 1113, 1114, 1115, and 1116 can exist within memory 1120.

Banana Routing Techniques

With modern gaming consoles, since the payload of each packet is encrypted, a would-be attacker only has three items of observable information. Namely, the would-be attacker may observe the source and destination addresses in packet headers, the size of a packet, and the relative timing of packets. The subject specification discloses techniques for addressing each of these issues as discussed below.

Because an attacker can inspect packet headers to determine the source of an inbound packet or the destination of an outbound packet, securing such information is desirable, so as to prevent attackers from perturbing packets and/or learning the address of other players' consoles for a DoS attack. Banana routing addresses this attack via proxies that relay traffic from a source to a destination. In an aspect, for each content packet, the source constructs an encrypted wrapper packet that contains the content packet and the address of the ultimate destination. Within such embodiment, the source sends the wrapper packet to the proxy, which extracts the content packet and forwards it to the indicated destination.

By using proxies for all traffic, banana routing prevents an attacker at the source from observing the address of the destination, and it prevents an attacker at the destination from observing the address of the source. Without knowing the true address of another player's machine, an attacker is prevented from launching a DoS attack against the other player.

However, for a packet-perturbation attack, an attacker need not know the true address of another player. For instance, by perturbing packets to or from a particular proxy and then observing the effect on gameplay, an attacker can determine whether it is beneficial to perturb packets based on the proxy that relays them. As such, particular techniques for combating such an attack are contemplated below.

In one aspect, a sender proxy (SP) may be utilized to relay all outbound packets from a particular source. Within such embodiment, every outbound packet from the source contains the same destination address, namely the address of the sender proxy. This prevents an attacker from learning any useful information by observing destination addresses in outbound packets.

In another aspect, a receiver proxy (RP) may be utilized to relay all packets to a particular destination. Within such embodiment, every inbound packet to the destination contains the same source address, namely the address of the receiver proxy. This prevents an attacker from learning any useful information by observing source addresses in inbound packets.

In yet another embodiment, unbound proxies may be utilized as relays that forward packets but are not bound to any particular source or destination. It should be noted that, although an unbound proxy prevents an attacker from learning another computer's true address, it fails to obscure all useful information in packets' source and destination addresses. Thus, unbound proxies are generally appropriate for classes of packets whose source and destination are not of particular concern.

With respect to observing the size of a packet, it should be noted that an attacker may utilize such observation to infer information about the packet contents. For instance, an attacker may selectively drop inbound packets if their size indicates that the attacker-player has been damaged by another player's weaponry. Banana routing addresses such attacks via the primitive techniques of padding and splitting.

In theory, every packet could be padded to the maximum packet size, which would completely obscure any packet size information. However, for games whose maximum packet size is significantly larger than the mean packet size, such aggressive padding could cause a prohibitive increase in bandwidth demand. Therefore, in an embodiment, rather than padding all packets up to the maximum packet size, packets are instead padded up to a standardized packet size (e.g., the 95th-percentile of the maximum packet size), and any larger packet is split into multiple packets having a standardized packet size.

Because most online games have heavily skewed packet-size distributions, with the majority of packets being relatively small (<512 bytes per packet), padding/splitting is particularly useful. Splitting is also useful for separating packet contents by type. In particular, because in some jurisdictions it is illegal to encrypt voice traffic, if a packet contains both voice data and game-critical content, an attacker might be able to infer the packet's source from the unencrypted voice data and then selectively perturb the packet. In an embodiment, splitting can be used to transmit the voice data in a separate packet, whose perturbation will not affect the game state.

An attacker may also derive useful information from the relative timing of packets. For instance, consider a game in which, on every frame, messages fan out from a sender to multiple receivers in the same transmitted order (e.g., because of a simple loop in the game engine). Similarly, a game may include messages fanning in from multiple senders to a receiver in the same received order (e.g., because of different network distances from the various senders or because a colluding sender deliberately delays its packets so they can be easily identified). Such consistent timing allows an attacker to learn the association between a packet's destination or source and its order within a frame.

In an aspect, banana routing addresses this attack via the primitive technique of mixing the traffic between a proxy and its associated source or destination. In one embodiment, traffic between a source and a proxy is mixed at the source, which permutes the transmitted order of packets on each frame. In another embodiment, traffic between a receiver proxy and a destination is mixed at the proxy, which waits for all or a multiplicity of packets to arrive for a particular frame and then forwards them in a permuted order.

When mixing at the receiver proxy, at least two additional issues should be considered. First, since packets may be lost enroute to the proxy, the proxy must wait only a limited time before forwarding the packets for a given frame, even if not all packets have been received yet. In an aspect, as will be discussed later, the proxy may be configured to drop any packet it receives after it has timed out. Second, during the time that the receiver proxy waits for more packets, any packets it has already received will become increasingly stale. In an embodiment, this staleness can be minimized by orchestrating the sources to generate and send their packets to each receiver proxy so that they are received at roughly the same time. Such orchestration may, for example, be achieved with a simple phase-locked loop using timing feedback from the proxy to each source.

In an embodiment, proxy techniques are also provided to address potential collusion amongst proxies. Here, it should first be noted that, because a proxy could be a game console, the count of proxies grows with the count of game participants. Although it may seem natural to use the machines involved in a game as proxies for that game, this would enable collusion between players and proxies. In particular, if packets are only communicated among machines involved in the game, then packets into and out of each machine contain the true address of at least one other machine in the game. An attacker can observe the address in the packet header and launch a DoS attack against the other machine. Here, it should be noted that this problem could not be solved by only allowing direct communication among machines having no incentive to launch a DoS attack on each other (e.g., those on the same team). Namely, address information must eventually be revealed across opposing teams since at least one link must connect two machines on opposing teams (i.e., when a machine needs to send a packet to another player's machine).

In one aspect, banana routing addresses this issue by using remote proxies, which are machines that are not involved in the game or under control of a player that has another machine in the game. For instance, such proxy machines may be consoles involved in other games.

In an embodiment, proxy techniques are also provided to address potential collusion amongst players. Here, it should first be noted that, although a receiver proxy hides source information, it does not hide receiver information in the presence of collusion. For instance, if receiver R observes that inbound packets have a source address of proxy P, it can use out-of-band means to tell sender S that P is the receiver proxy for R. Sender S then knows that when it sends a packet to P, the destination of the content will be R.

In an aspect, such collusion is addressed by providing the primitive of proxy rotation. Within such embodiment, on every frame, the assignment of proxies to receivers is rotated pseudo-randomly. Here, it should be noted that by sharing a seed value among multiple machines, each machine can be configured to generate the exact same sequence of pseudo-random values, so that they can coordinate their actions without further communication with each other. Furthermore, without access to this seed value, it is difficult for an attacker to determine the next value in the sequence merely by observing the values employed so far. To an attacker, the sequence thus appears random. For this particular embodiment, by the time receiver R tells sender S that P was its receiver proxy, the assignment will have changed, so S will be unable to use this information effectively.

It should be noted that this technique may require that all sources and receiver proxies maintain a synchronized count of the current frame. However, this is not particularly challenging since game frames are typically larger than the error seen in network time estimation.

After initially agreeing on a random seed value, each machine can locally derive each frame's assignment from the output of a pseudo-random-number generator that is advanced per frame. If a proxy fails and is replaced during a game, the replacement need only be told the seed value and the current frame.

It should be further noted that a source may attempt to defeat the rotation by delaying outgoing packets so that they are received after the proxy has advanced its frame count. To thwart such attack, the proxy should drop any packet it receives after the time window for the packet's indicated frame has passed.

In an aspect, techniques are also provided for reducing resource requirements. Outbound bandwidth, for instance, can be a particularly scarce resource for a machine that is used as a proxy and that may also be participating in another game. To address this issue, banana routing includes the primitive of proxy sets, which are sets of machines that share the duties of a regular proxy. Within such embodiment, instead of sending a packet to a single proxy machine, a source sends packets to all machines in the proxy set. One of these machines relays the packet to the destination, and the other machines drop the packet. The particular machine that relays the packet should be selected randomly or pseudo-randomly. This technique reduces the average transmission load on proxy machines, at the expense of additional transmission load on sources.

More specifically, a proxy set can be characterized by parameters k and r, wherein the count of machines in the proxy set is kr. The source divides its content into k fragments and transmits r copies of each fragment, such that every proxy machine receives a packet from the source. For each fragment, exactly one of the receiving proxies forwards the fragment to the destination.

The mean load reduction obtained by utilizing proxy sets can be conceptualized by referring to the following example. First, it is assumed that the size of the content, wrapper, and header are c, w, and h, respectively. Without proxy sets, the source sends a packet of size $c+w+h$ to the proxy, which forwards a packet of size $c+h$ to the destination. With proxy sets, the source sends kr packets of size $c/k+w+h$, and $1/r$ of the proxy machines forward packets of size $c/k+h$ to the destination. Thus, the mean load on each proxy machine decreases from c+h to (c/k+h)/r, and the mean load on each source increases from c+w+h to r·(c+k·(w+h)). Games with small packet contents may select k=1, as increasing k provides little benefit to proxies but significant cost to sources. Games with large packet contents may select r=1 since increasing r is not much more helpful to proxy machines than is increasing k, but it applies a greater cost to sources.

With respect to security analysis, the two cases of sender proxies and receiver proxies are considered separately. When using sender proxy sets, for each item of content to a particular destination, the source sends a packet to every machine in the proxy set. Thus, every batch of kr packets includes the addresses of all machines in the set, so the attacker learns no useful information from observing these destination addresses.

The analysis for receiver proxy sets in roughly parallel but slightly more subtle. For receiver proxy sets, every machine in the proxy set receives packets from all senders. Thus, although the destination may receive packets from only a subset of the machines in the proxy set, this subset is chosen arbitrarily and unpredictably, so there is no correlation between the subset and the source of the content. An attacker at the destination therefore learns no useful information from observing the source addresses of inbound packets, since they indicate only which arbitrarily selected machine in the proxy set was chosen to perform the forwarding.

However, even for receiver proxy sets, it may be desirable to prevent the source from knowing which of the proxy machines are forwarding the source's packets on any given frame. Otherwise, a colluding source could tell the destination which proxy machines will be forwarding its packets. In the description above, this information is hidden from the source because the source sends packets to all machines in the proxy set, even to those that will drop the packets.

To coordinate which machines in a proxy set forward/drop packets during each frame, synchronized pseudo-random-number generators may be applied, as previously discussed. Alternatively, this choice can be made independently and randomly by the sender by including a bit in each wrapper that indicates whether the content should be forwarded. This alternative approach performs adequately for sender proxy sets, but may produce suboptimal load balancing in receiver proxy sets, since the senders' choices are made independently.

Although proxy sets can be used for both sender proxies and receiver proxies, the expected benefits are greater for receiver proxies, for two reasons. First, whereas a sender proxy sends only as much traffic as its associated source sends, a receiver proxy sends as much traffic as its associated destination receives. Because access links typically have much higher inbound bandwidth than outbound bandwidth, a receiver proxy could well require more outbound bandwidth than it has available. Second, when mixing is employed, receiver proxies accumulate packets and then forward them in a burst. By contrast, sender proxies generally do not perform mixing since packets are mixed at the source instead.

Since forwarding traffic through a proxy adds latency to communication, embodiments for minimizing such latency are also disclosed. In one aspect, to keep this latency low, the aforementioned matchmaking system attempts to select proxies that are near (in network-delay space) to the players in a game. Within such embodiment, the more proxies required for a game, the more challenging it is for the matchmaking system to find a suitable set of machines to act as proxies.

To address this issue, banana routing includes the primitive of shared proxies, wherein a single machine acts in multiple proxy roles concurrently. Shared proxies can take many forms. For instance, a machine could act as a sender proxy for multiple game machines, or as both a sender proxy and a receiver proxy for a single game machine.

Another potential circumstance for using a shared proxy is when a single machine acts as a receiver proxy for all machines in a game. In this case, if the receiver proxies had been employing proxy rotation, the use of a shared proxy renders this rotation no longer necessary, because all receiver proxies have the same address.

Although it is perhaps not obvious, there are no security implications from using shared proxies. For instance, it might seem that a single machine could not safely act in the role of sender proxy for one game machine and receiver proxy for another, because packets from the former machine to the latter would pass through only one proxy, which might seem to weaken the information hiding. However, such sharing does not compromise the properties of either proxy: The sender proxy still relays all outbound packets from the former machine, and the receiver proxy still relays all inbound packets to the latter. This observation permits another noteworthy configuration, wherein a single central proxy relays all packets to and from every game machine.

Shared proxies are thus effectively the opposite of proxy sets. Shared proxies reduce the count of proxy machines but increase the bandwidth load on each machine, whereas proxy sets have the reverse effect.

Exemplary Architecture for C/S Games

In an embodiment, a complete solution for thwarting traffic analysis addresses the information leaked by packet headers, packet sizes, and relative packet timing, in addition to the sharing of such information by colluding attackers. For some of these information sources, there is more flexibility as to potential design options. For instance, in addressing packet-header inspection, collusion between players, and potential resource overload or undersupply, various combinations of sender proxies, receiver proxies, proxy rotation, proxy sets, and shared proxies may be utilized.

Referring first to C/S games, it should be noted that traffic patterns of C/S games dictate that all clients' outbound traffic is destined for the server. Thus, there is generally no need to prevent clients from determining the destination of outbound packets. Instead, designs may be implemented so that the server is prevented from determining the source of inbound packets such as the exemplary client-to-server designs provided in FIGS. 12A-12C, which are discussed below.

Figure 12A:
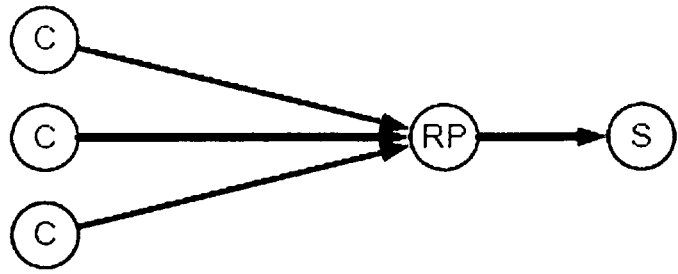
FIG. 12 is an illustration of various exemplary client-to-server proxy configurations.

In a first proxy configuration, a single receiver proxy is bound to the server (hereinafter referred to as a "C→S◊RP" configuration), as illustrated in FIG. 12A. Here, although in terms of information hiding, this is configuration is sufficient, it may be subject to link overload. As described above, receiver proxies are particularly susceptible to link overload, and this is especially true of the receiver proxy for a server machine since it forwards traffic from all other machines in the game.

Figure 12B:
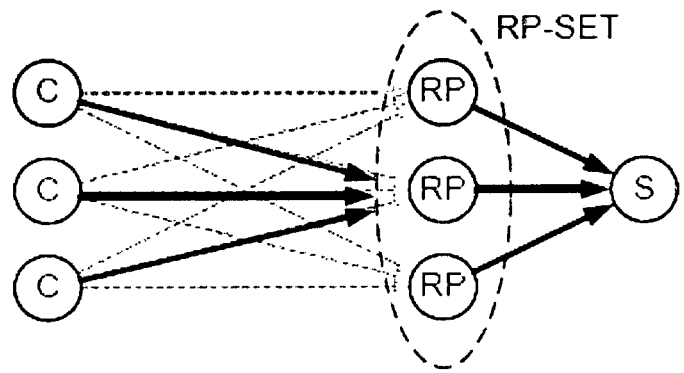

In another configuration, this link overload issue is addressed by utilizing a receiver proxy set bound to the server (hereinafter referred to as a "C→S◊RP-SET" configuration), as illustrated in FIG. 12B. This reduces the load per proxy machine. A potential disadvantage of this approach is that it increases the transmission load on clients since each client sends packets to all machines in the proxy set. As described above, a purpose of this redundant transmission is to prevent a colluding client from telling the server which of the proxy machines is forwarding packets from that client.

Figure 12C:
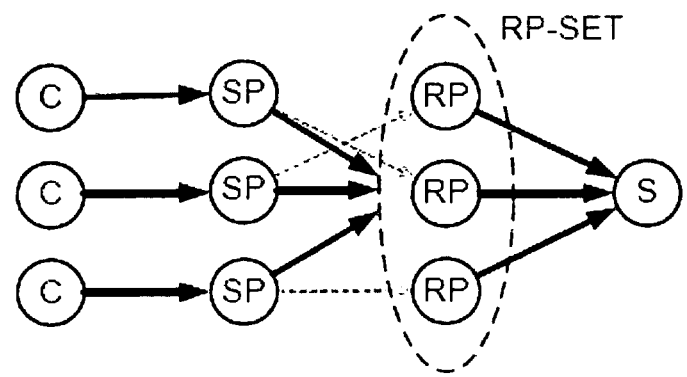

In a third configuration, as provided in FIG. 12C, sender proxies are used to isolate the clients from the receiver proxy set so as to prevent clients from knowing which proxy forwards its packets (hereinafter referred to as a "C→S◊SP- RP-SET" configuration). Although the client knows a priori that the ultimate destination is always the server, a sender proxy prevents it from learning the intermediate destination, namely the receiver proxy machine that forwards its packets. A potential disadvantage of this approach, relative to the previous one, is that packets must traverse three network links instead of two, which increases latency.

In a C/S game, because all clients' inbound traffic originates from the server, there is generally no need to prevent clients from determining the source of inbound packets. Instead, designs may be implemented so that the server is prevented from determining the destination of outbound packets. As such, exemplary server-to-client proxy configurations are provided in FIGS. 13A-13C and discussed below.

Figure 13A:
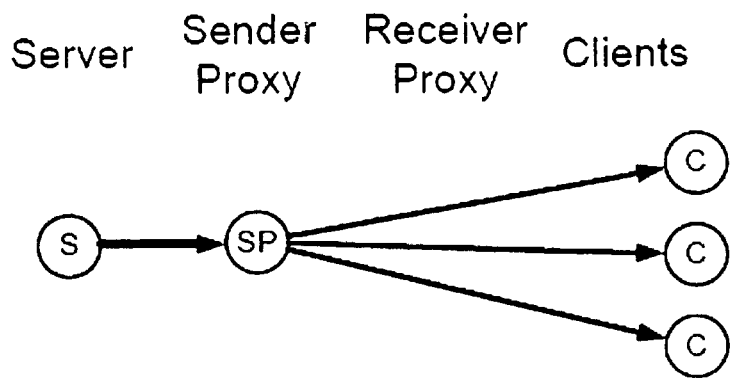
FIG. 13 is an illustration of various exemplary server-to-client proxy configurations.

In a first configuration, a sender proxy is bound to the server (hereinafter referred to as a "S→C ◇ SP" configuration), as illustrated in FIG. 13A. Here, such embodiment adequately hides destination information and may also be sufficient to support the associated bandwidth demand since sender proxies are not especially susceptible to link overload.

Figure 13B:
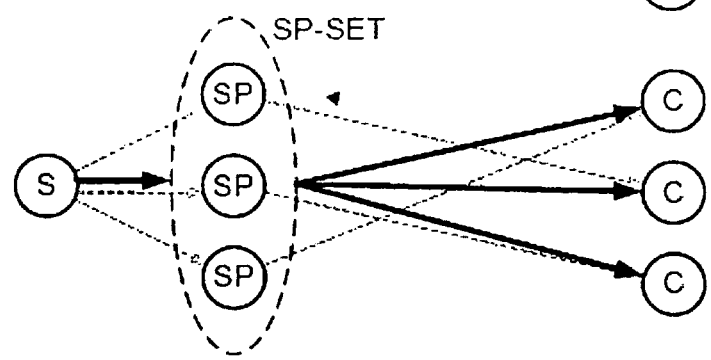

However, because servers send information to all clients, matchmaking systems often select high-bandwidth machines to act as servers. Accordingly, if a comparably high-bandwidth machine cannot be found to act as a sender proxy, this approach may result in link overload. In a second configuration, as illustrated in FIG. 13B, this link overload issue is addressed by binding a sender proxy set to the server (hereinafter referred to as a "S→C ◇ SP-SET" configuration). However, a disadvantage of this approach is that it increases the transmission load on the server, which is already likely to be stressed since it sends packets to all other machines in the game.

Figure 13C:
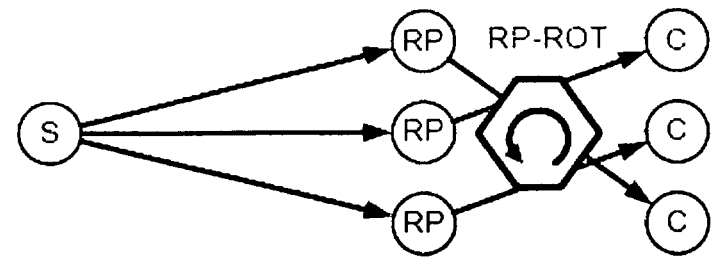

In a third configuration, as illustrated in FIG. 13C, bandwidth demand is spread amongst multiple proxy machines by using rotating receiver proxies for the clients (hereinafter referred to as a "S→C ◇ RP-ROT" configuration). Although designed for hiding source information, receiver proxies also hide destination information when combined with proxy rotation. Unlike the previous alternative, this approach does not require the sender to send redundant packets to multiple proxy machines. Furthermore, by employing the technique of shared proxies, the count of receiver proxy machines can be reduced to match the count of proxy machines in the sender proxy set configuration described in FIG. 13B.

Relative advantages and disadvantages of the aforementioned C/S configurations are discussed below.

For client-to-server traffic, binding a receiver proxy set to the server (C→S ◇ RP-SET) may be particularly desirable. For instance, such configuration might be chosen over the simple C→S ◇ RP because of concerns about link overload, which is an acute issue for receiver proxies in general and for server machines in particular. Although the C→S ◇ RP-SET approach increases the transmission load of client machines, this is not overly important since clients generally have a fairly low transmission rate relative to that of the server. Thus, there might not be a need to employ the third alternative, C→S ◇ SP-RP-SET, of adding sender proxies, especially since doing so would add significant latency in the client-to-server path. In an embodiment, each client uses padding/splitting to ensure that all packets are the same size; the receiver proxy machines mix their traffic before forwarding it; and all proxies are remote from the game.

For server-to-client traffic, binding a sender proxy to the server (S→C ◇ SP) may be particularly desirable. Because link overload is generally not a big concern for sender proxies, there might not be a need to employ either of the two other alternatives. In an embodiment, the server pads/splits its transmitted packets, and mixes its packets before sending them to the remote sender proxy.

In addition to the above traffic classes, it should be noted that C/S games sometimes include a small amount of any-to-any traffic. In general, this traffic includes non-game-critical information, such as voice transmission and content-free heartbeats for refreshing NAT tables. For the most part, there is no need to hide the source or destination of such traffic, as long as either endpoint is prevented from learning the true address of the other, which would enable a DoS attack. Thus, for this class of traffic, a pool of unbound proxies might be employed and scaled to accommodate the volume of such traffic.

Any-to-any traffic may also need to be addressed in which the source or destination is the server. Some games may piggyback such traffic on game-critical packets that are already being exchanged between the server and a client. An attacker might try to analyze this traffic (for instance, by Fourier analysis of voice content) and apply the result to the co-transmitted game-critical packet. To prevent such attack, splitting might be used to remove the piggybacking.

Exemplary Architecture for P2P Games

In P2P games, it is generally desirable to prevent all machines from determining the destination of outbound packets and the source of inbound packets. In an aspect, any of various proxy configurations and primitives may be implemented to achieve such objective. In FIGS. 14A-14D, various exemplary proxy configurations for P2P games are illustrated, which are discussed below.

Figure 14A:
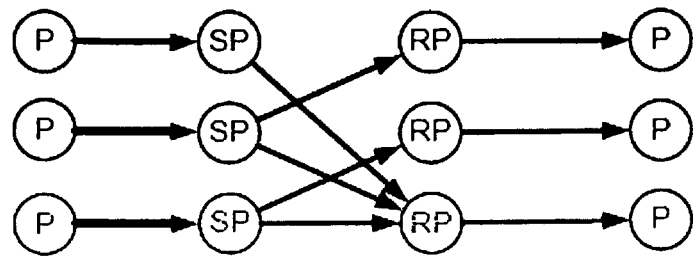
FIG. 14 is an illustration of various exemplary peer-to-peer proxy configurations.

In a first configuration, as illustrated in FIG. 14A, all traffic is first passed through a sender proxy and then through a receiver proxy (hereinafter referred to as a "P→P ◇ SP-RP" configuration). Because the transmission load on each sender proxy is the same as the transmission load on its associated game peer, there is generally no risk of link overload for sender proxies. However, for receiver proxies, link overload might be a concern since each source's game traffic might not be distributed equally to all destinations.

Figure 14B:
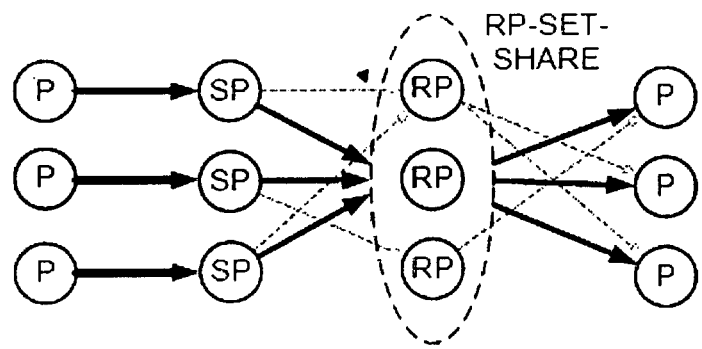

In a second configuration, as illustrated in FIG. 14B, this potential concern is addressed by retaining the individual sender proxies, but using receiver proxy sets instead of individual receiver proxies (hereinafter referred to as a "P→P ◇ SP-RP-SET-SHARE" configuration). Furthermore, it uses shared proxies to share all of the receiver proxy sets among all of the peers. Within such embodiment, during each frame, there is a random one-to-one assignment of receiver proxy machines to sender proxy machines. A peer sends an outgoing packet to its sender proxy, which forwards it to the receiver proxy machine it is currently assigned, and this machine forwards the packet to the indicated destination. Security is maintained because there is no correlation between the receiver proxy machine and the source of the content. Also, the potential overload is alleviated because the transmission load on each proxy machine, either sender or receiver, is equal to the transmission load of the source.

Figure 14C:
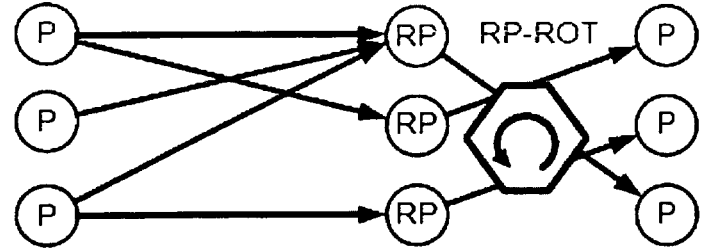

It should be noted that both of the prior alternatives undesirably require packets to traverse three network links instead of two, which increases latency. In a third configuration, as illustrated in FIG. 14C, this problem is addressed by omitting the sender proxies and using rotating receiver proxies (hereinafter referred to as a "P→P ◇ RP-ROT" configuration). The use of receiver proxies hides source information from the destination, and the rotation hides destination information from the source. However, as in the first alternative, this approach has the potential problem of link overload for the receiver proxies.

Figure 14D:
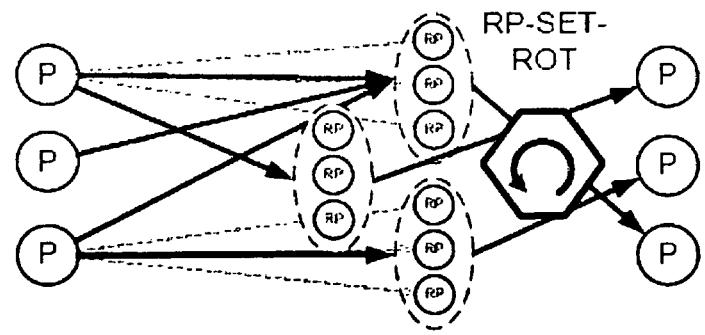

In a fourth configuration, as illustrated in FIG. 14D, this issue is addressed by using rotating receiver proxy sets (hereinafter referred to as a "P→P ◊ RP-SET-ROT" configuration). A disadvantage of this approach is that, in the absence of sender proxies, sources have to send all of their packets to all machines in the receiver proxy set. This disadvantage persists irrespective of whether shared proxies are also employed.

In a fifth configuration (not shown in the Figures), a single central proxy is utilized (hereinafter referred to as a "P→P ◊ CENTRAL" configuration). Namely, if the aggregate traffic rate is low enough, it may be possible to use such a single central proxy to relay all packets for all peers. In view of the available primitives, this approach can be viewed as the application of shared proxies to either the first or third alternative above. With respect to the first alternative, the central proxy shares the duties of all sender and receiver proxies, thereby eliminating the network hop between the two proxies. With respect to the third alternative, the central proxy shares the duties of all receiver proxies, thereby obviating the need for proxy rotation.

Here, although there are merits to each of the aforementioned P2P configurations, rotating receiver proxies (P→P ◊ RP-ROT) may be particularly desirable. In one aspect, P→P ◊ RP-ROT might be preferred over the first (P→P ◊ SP-RP) and second (P→P ◊ SP-RP-SET-SHARE) configurations because the latter approaches require three network hops, which may yield undesirably high latency. The P→P ◊ RP-ROT configuration might also be preferred over the P→P ◊ RP-SET-ROT configuration since the P→P ◊ RP-SET-ROT configuration significantly increases the transmission load on each peer.

It should be noted that some of the characteristics observed here with respect to P2P proxy configurations are in contrast to characteristics observed in configurations for C/S games (e.g., a receiver proxy set for client-to-server traffic was observed to be particularly desirable). The difference is that each client in a C/S game sends packets only to the server, whereas each peer in a P2P game sends packets to every other peer, which causes the peers to have a higher base transmission load than clients. As mentioned above, the alternative of a central proxy can be viewed as an instance of the third configuration, which may be deemed a sensible approach for games with sufficiently light traffic. In an embodiment, peers employ padding/splitting, and the receiver proxies are remote proxies that mix their outbound packets.

Matchmaking

To participate in an online game, prospective players must find others who are interested in playing and who have machines that will interact acceptably. The process of identifying a set of such players is known as matchmaking. In various embodiments, a matchmaking system may be employed to match player computers that employ the techniques described herein. Since the disclosed matchmaking system is an extension of existing matchmaking systems, a brief overview of current systems is provided below.

A conventional matchmaking process begins when a player's machine contacts a central matchmaking service, such as Xbox LIVE© or PlayStation Network©. The service determines, based on several factors, whether the machine will act as a host or a guest for the game. If the machine is selected as a host, the service creates a new game roster and sets its properties, such as the game title and options desired by the player. The service then adds the host to the roster, and the host waits for the roster to fill with guests.

If the machine is to be a guest, the service scans its list of incomplete rosters to find those that have agreeable properties (e.g., matching game title, compatible options, comparable player skill level, etc.). The service then sends a list of these rosters' hosts to the guest. The guest then pings each host, selects the host with the lowest latency, and asks the service to add it to that host's roster. Sometimes, a guest will not find any host with an acceptably low latency. If this happens, the service loosens the matchmaking criteria, selects additional rosters, and repeats the process. In C/S games, the host typically becomes the server. Thus, the service will designate a machine as a host only if the machine meets the requirements for a server.

For banana routing, the matchmaking service must also select an appropriate set of machines to act as proxies for the new game. In an aspect, these proxy machines should satisfy three criteria: First, they should have sufficient network bandwidth to support the load of relaying packets; second, they should have low network latency to the game machines; and, third, they should not be under the control of any player in the game. Also, to thwart header-inspection attacks, the matchmaking process should not involve direct exchange of packets between game machines. In an embodiment, these goals are achieved by making two key modifications to the standard matchmaking process.

First, when the matchmaking service designates a machine as a host, the service randomly selects a group of other machines as proxy candidates for the newly forming game. The service sends the host's address to the candidates, who each ping the host. The candidates with the lowest latency to the host are then assigned as proxies for the new game.

Second, when the service designates a machine as a guest and finds a suitable set of rosters, the service does not send the address of each roster's host to the guest. Instead, the service sends the guest's address to the group of proxies associated with each roster. The proxies then ping the guest and report their latencies to the service. For each roster, the service computes the maximum latency to the guest over all proxies in the group. The guest is then added to the roster with the lowest maximum proxy latency. This process selects a set of game machines and proxy machines without disclosing the addresses of game machines to each other. In addition, the service only selects machines with sufficient bandwidth to be proxy candidates, and the selection process uses pings to ensure that the latency between every proxy machine and every game machine is below an acceptable threshold. Furthermore, because the service allows the host to choose proxies from only a small random subset of all game machines, it is unlikely that any of these machines will be under the same player's control.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may cooperate to perform one or more aspects of any of the various embodiments of the subject disclosure.

Figure 15:
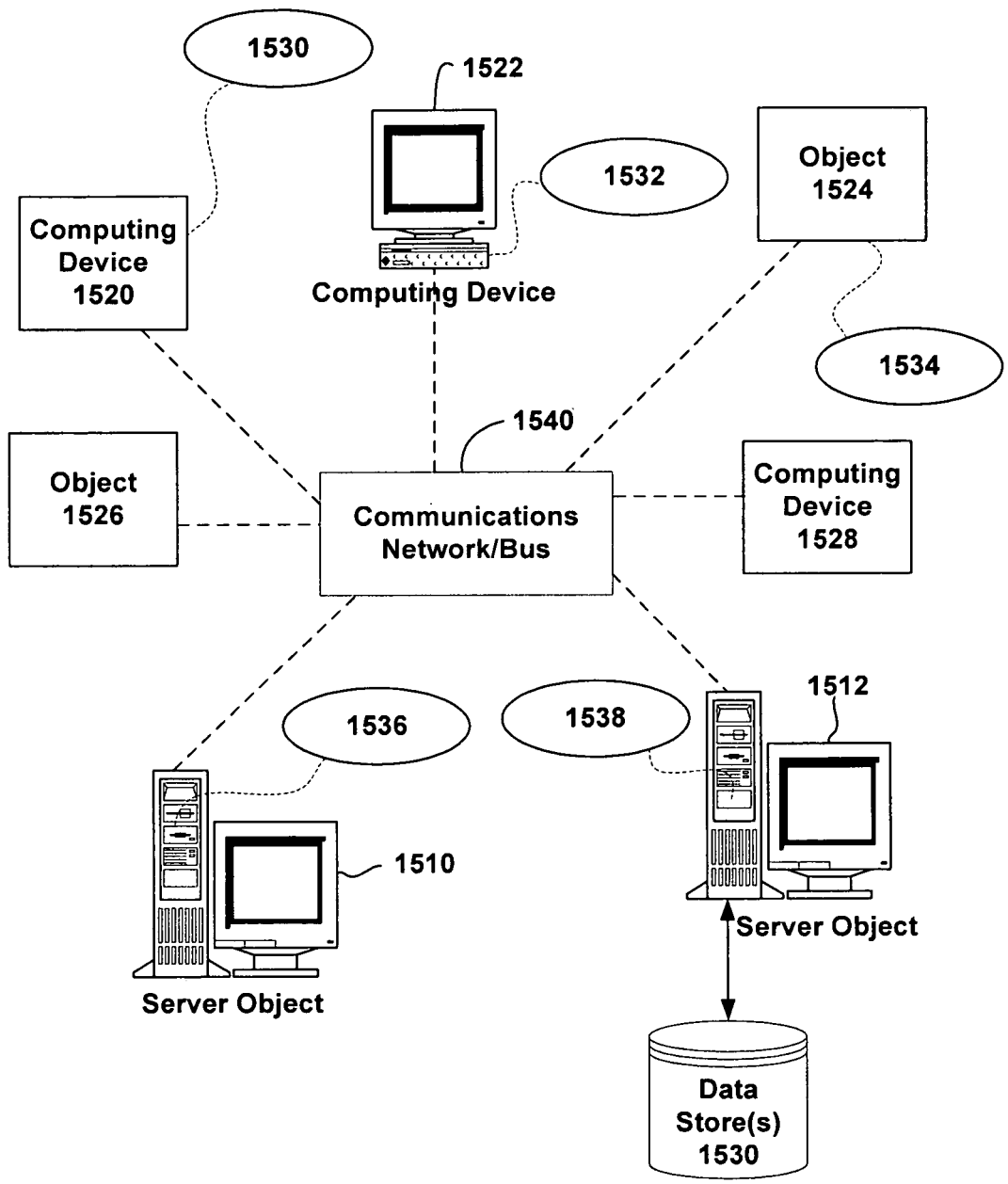
FIG. 15 is a block diagram representing exemplary non-limiting networked environments in which various embodiments described herein can be implemented.

FIG. 15 provides a schematic diagram of an exemplary networked or distributed computing environment. The distributed computing environment comprises computing objects 1510, 1512, etc. and computing objects or devices 1520, 1522, 1524, 1526, 1528, etc., which may include programs, methods, data stores, programmable logic, etc., as represented by applications 1530, 1532, 1534, 1536, 1538. It can be appreciated that objects 1510, 1512, etc. and computing objects or devices 1520, 1522, 1524, 1526, 1528, etc. may comprise different devices, such as PDAs, audio/video devices, mobile phones, MP3 players, personal computers, laptops, etc.

Each object 1510, 1512, etc. and computing objects or devices 1520, 1522, 1524, 1526, 1528, etc. can communicate with one or more other objects 1510, 1512, etc. and computing objects or devices 1520, 1522, 1524, 1526, 1528, etc. by way of the communications network 1540, either directly or indirectly. Even though illustrated as a single element in FIG. 15, network 1540 may comprise other computing objects and computing devices that provide services to the system of FIG. 15, and/or may represent multiple interconnected networks, which are not shown. Each object 1510, 1512, etc. or 1520, 1522, 1524, 1526, 1528, etc. can also contain an application, such as applications 1530, 1532, 1534, 1536, 1538, that might make use of an API, or other object, software, firmware and/or hardware, suitable for communication with, processing for, or implementation of the column based encoding and query processing provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the column based encoding and query processing as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 15, as a non-limiting example, computers 1520, 1522, 1524, 1526, 1528, etc. can be thought of as clients and computers 1510, 1512, etc. can be thought of as servers where servers 1510, 1512, etc. provide data services, such as receiving data from client computers 1520, 1522, 1524, 1526, 1528, etc., storing of data, processing of data, transmitting data to client computers 1520, 1522, 1524, 1526, 1528, etc., although any computer can be considered a client, a server, or both, depending on the circumstances. Any of these computing devices may be processing data, encoding data, querying data or requesting services or tasks that may implicate the column based encoding and query processing as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the column based encoding and query processing can be provided standalone, or distributed across multiple computing devices or objects.

In a network environment in which the communications network/bus 1540 is the Internet, for example, the servers 1510, 1512, etc. can be Web servers with which the clients 1520, 1522, 1524, 1526, 1528, etc. communicate via any of a number of known protocols, such as the hypertext transfer protocol (HTTP). Servers 1510, 1512, etc. may also serve as clients 1520, 1522, 1524, 1526, 1528, etc., as may be characteristic of a distributed computing environment.

Exemplary Computing Device

Figure 16:
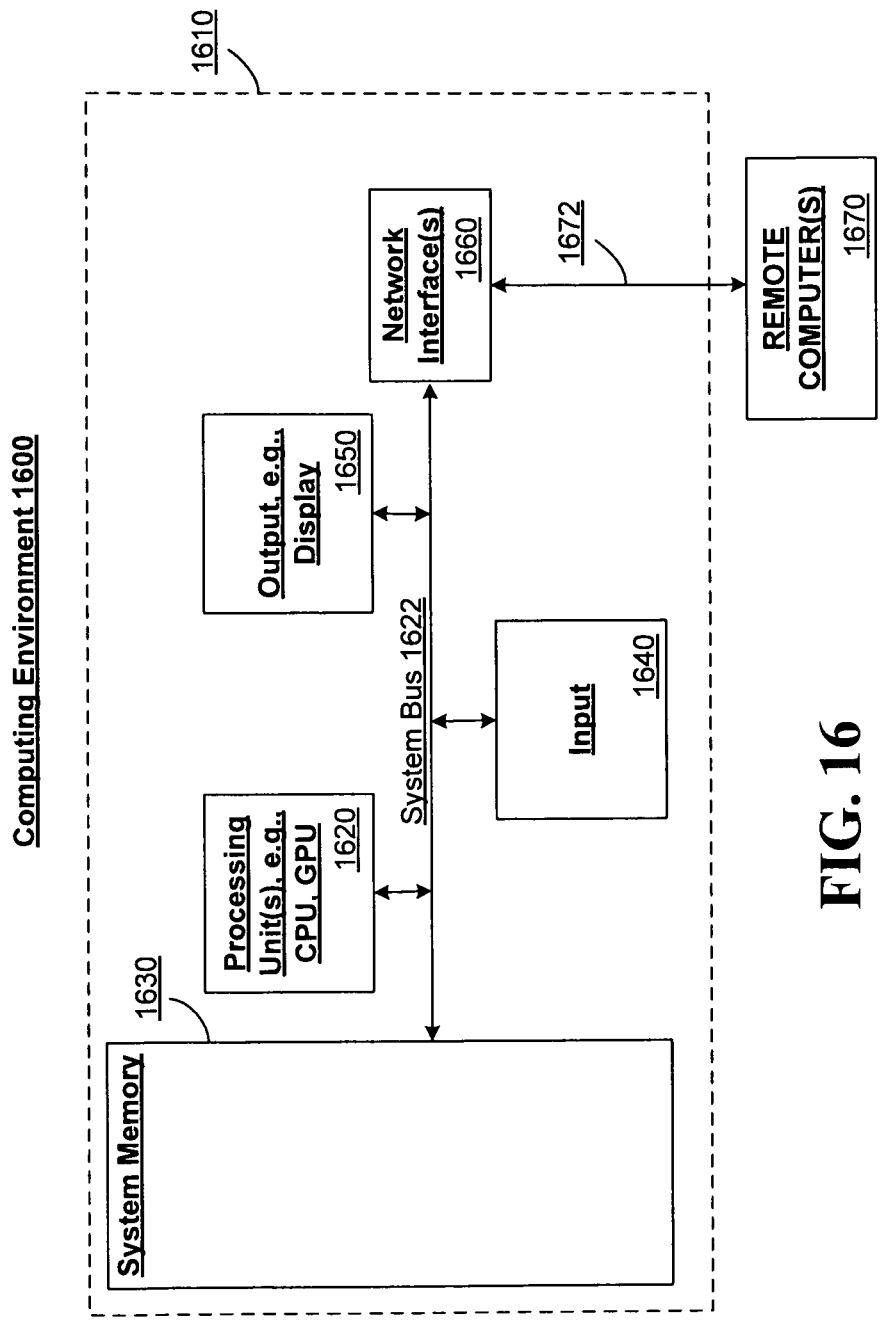
FIG. 16 is a block diagram representing an exemplary non-limiting computing system or operating environment in which one or more aspects of various embodiments described herein can be implemented.

As mentioned, advantageously, the techniques described herein can be applied to any device where it is desirable to route data in a network-based computer game. It should be understood, therefore, that handheld, portable and other computing devices and computing objects of all kinds are contemplated for use in connection with the various embodiments. In FIG. 16, a diagram of a general-purpose computer is provided so as to illustrate an exemplary architecture for one such computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

FIG. 16 thus illustrates an example of a suitable computing system environment 1600 in which one or aspects of the embodiments described herein can be implemented, although as made clear above, the computing system environment 1600 is only one example of a suitable computing environment and is not intended to suggest any limitation as to scope of use or functionality. Neither should the computing environment 1600 be interpreted as having any dependency or requirement relating to any one or combination of components illustrated in the exemplary operating environment 1600.

With reference to FIG. 16, an exemplary device for implementing one or more embodiments includes a general purpose computing device in the form of a computer 1610. Components of computer 1610 may include, but are not limited to, a processing unit 1620, a system memory 1630, and a system bus 1622 that couples various system components including the system memory to the processing unit 1620.

Computer 1610 typically includes a variety of computer readable media and can be any available media that can be accessed by computer 1610. The system memory 1630 may include computer storage media in the form of volatile and/or nonvolatile memory such as read only memory (ROM) and/or random access memory (RAM). By way of example, and not limitation, memory 1630 may also include an operating system, application programs, other program modules, and program data.

A user can enter commands and information into the computer 1610 through input devices 1640. A monitor or other type of display device is also connected to the system bus 1622 via an interface, such as output interface 1650. In addition to a monitor, computers can also include other peripheral output devices such as speakers and a printer, which may be connected through output interface 1650.

The computer 1610 may operate in a networked or distributed environment using logical connections to one or more other remote computers, such as remote computer 1670. The remote computer 1670 may be a personal computer, a server, a router, a network PC, a peer device or other common network node, or any other remote media consumption or transmission device, and may include any or all of the elements described above relative to the computer 1610. The logical connections depicted in FIG. 16 include a network 1672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to compress large scale data or process queries over large scale data.

Also, there are multiple ways to implement the same or similar functionality, e.g., an appropriate API, tool kit, driver code, operating system, control, standalone or downloadable software object, etc. which enables applications and services to use the efficient encoding and querying techniques. Thus, embodiments herein are contemplated from the standpoint of an API (or other software object), as well as from a software or hardware object that provides column based encoding and/or query processing. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A receiver proxy comprising:
    computer-readable instructions that configure the receiver proxy to:
        receive data packets from multiple player computers of multiple game players that are participating in a game, the multiple player computers executing instances of game code of the game, wherein the data packets are received in a particular order, permute the data packets into a permuted order that is different than the particular order in which the data packets were received from the multiple player computers, and send the data packets received from the multiple player computers of the multiple game players to another player computer of another game player in the permuted order that is different than the particular order in which the data packets were received from the multiple player computers, wherein the another player computer is also participating in the game by executing another instance of the game code of the game; and at least one processing unit configured to execute the computer-readable instructions.

2. A system comprising the receiver proxy of claim 1, the multiple player computers, and the another player computer, wherein the game is a client/server game, the another player computer is a server, and the multiple player computers are clients.

3. The system of claim 2, further comprising a receiver proxy set that is bound to the server and includes the receiver proxy and other receiver proxies, wherein the receiver proxy is further configured to drop other data packets received from the multiple player computers and the other receiver proxies from the receiver proxy set are configured to send the other data packets to the another player computer.

4. The receiver proxy of claim 1, wherein the computer-readable instructions further configure the receiver proxy to:
wait a limited amount of time for the data packets to arrive, the data packets each being associated with a frame of the game, and
drop other data packets associated with the frame of the game that are received from the multiple player computers after the limited amount of time has passed, wherein the other packets are dropped without sending the other data packets to the another player computer.

5. The receiver proxy of claim 1, wherein the receiver proxy is a remote proxy embodied as a gaming console that is configured to send and receive the data packets while the game console is not participating in the game and is participating in another game with other multiple game players.

6. The receiver proxy of claim 1, wherein the computer-readable instructions further configure the receiver proxy to:
receive the data packets from the multiple player computers and send the data packets to the another player computer during an individual frame of the game when the receiver proxy is assigned to the another player computer, and
during a subsequent individual frame of the game, rotate to act as the receiver proxy for a different player computer instead of the another player computer.

7. The receiver proxy of claim 1, wherein the game is a peer-to-peer game played by a plurality of peers including the multiple player computers and the another player computer is another peer of the plurality of peers.

8. One or more hardware computer storage media storing computer-readable instructions which, when executed by a computing device, cause the computing device to act as a receiver proxy by performing acts comprising:
receiving data packets from multiple player computers of multiple game players that are participating in a game, the multiple player computers executing instances of game code of the game, wherein the data packets are received in a particular order;

permuting the data packets into a permuted order that is different than the particular order in which the data packets were received from the multiple player computers; and sending the data packets received from the multiple player computers of the multiple game players to another player computer of another game player in the permuted order, wherein the another player computer is also participating in the game by executing another instance of the game code of the game.

9. The one or more hardware computer storage media of claim 8, wherein the game comprises multiple frames and each of the data packets are associated with a single frame of the game.

10. The one or more hardware computer storage media of claim 9, the acts further comprising:
waiting a limited amount of time for the data packets to arrive; and
dropping other data packets associated with the single frame of the game that are received from the multiple player computers after the limited amount of time has passed, wherein the other packets are dropped without sending the other data packets to the another player computer.

11. The one or more hardware computer storage media of claim 8, the acts further comprising:
during another single frame of the game, rotating to act as the receiver proxy for a different player computer of the multiple player computers instead of the another player computer.

12. The one or more hardware computer storage media of claim 11, the acts further comprising:
during the another single frame of the game:
receiving other data packets from other multiple player computers of the multiple game players that are participating in the game, wherein the other data packets are received in another particular order,
permuting the other data packets into another permuted order that is different than the another particular order in which the other data packets were received from the other multiple player computers, and
sending the other data packets received from the other multiple player computers to the different player computer in the another permuted order.

13. A method performed by a computing device acting as a receiver proxy, the method comprising:
receiving data packets from multiple player computers of multiple game players that are participating in a game, the multiple player computers executing instances of game code of the game, wherein the data packets are received in a particular order;

permuting the data packets into a permuted order that is different than the particular order in which the data packets were received from the multiple player computers; and sending the data packets received from the multiple player computers of the multiple game players to another player computer of another game player in the permuted order, wherein the another player computer is also participating in the game by executing another instance of the game code of the game.

14. The method of claim 13, wherein the game comprises multiple frames and each of the data packets are associated with a single frame of the game.

15. The method of claim 14, the acts further comprising:
waiting a limited amount of time for the data packets to arrive; and
dropping other data packets associated with the single frame of the game that are received from the multiple player computers after the limited amount of time has passed, wherein the other packets are dropped without sending the other data packets to the another player computer.

16. The method of claim 14, further comprising:
during another single frame of the game, rotate to act as the receiver proxy for a different player computer of the multiple player computers instead of the another player computer.

17. The method of claim 16, further comprising:
during the another single frame of the game:
receive other data packets from other multiple player computers of the multiple game players that are participating in the game, wherein the other data packets are received in another particular order,
permute the other data packets into another permuted order that is different than the another particular order in which the other data packets were received from the other multiple player computers, and
send the other data packets received from the other multiple player computers to the different player computer in the another permuted order.

18. The method of claim 13, wherein the game is a peer-to-peer game played by a plurality of peers including the multiple player computers and the another player computer is another peer of the plurality of peers.

19. The method of claim 13, wherein the game is a client/server game, the another player computer is a server, and the multiple player computers are clients.

20. The method of claim 19, wherein the game is a first-person shooter game.

* * * * *